(12) United States Patent
Yeh et al.

(10) Patent No.: US 12,502,353 B2
(45) Date of Patent: Dec. 23, 2025

(54) METHODS FOR TREATING CANCERS BY USING NANOFRAMES OF PRUSSIAN BLUE OR AN ANALOGUE THEREOF AND ITS PRODUCTION METHODS

(71) Applicant: NATIONAL CHENG KUNG UNIVERSITY, Tainan (TW)

(72) Inventors: Chen-Sheng Yeh, Tainan (TW); Wei-Peng Li, Tainan (TW); Liu-Chun Wang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 423 days.

(21) Appl. No.: 18/073,612

(22) Filed: Dec. 2, 2022

(65) Prior Publication Data
US 2024/0180830 A1    Jun. 6, 2024

(51) Int. Cl.
| | |
|---|---|
| *A61K 9/127* | (2025.01) |
| *A61K 33/26* | (2006.01) |
| *A61K 41/00* | (2020.01) |
| *A61K 45/06* | (2006.01) |
| *A61P 35/00* | (2006.01) |

(52) U.S. Cl.
CPC .............. *A61K 9/127* (2013.01); *A61K 33/26* (2013.01); *A61K 41/0052* (2013.01); *A61K 45/06* (2013.01); *A61P 35/00* (2018.01)

(58) Field of Classification Search
CPC .... A61K 9/127; A61K 33/26; A61K 41/0052; A61K 45/06; A61K 9/0024; A61P 35/00
See application file for complete search history.

(56) References Cited

U.S. PATENT DOCUMENTS

2020/0163899 A1*  5/2020  Fernandes ............... A61P 43/00

FOREIGN PATENT DOCUMENTS

CN          105797157 A  *  7/2016

* cited by examiner

*Primary Examiner* — David Browe
(74) *Attorney, Agent, or Firm* — NZ Carr Law Office

(57) ABSTRACT

Disclosed herein is a method for producing a nanoframe of Prussian blue (PB) or an analogue thereof (PBA). The producing method comprises: (a) mixing a nanocube of PB or PBA with an acid solution to form a mixture; and (b) heating the mixture of the step (a) in an oil bath at 80-100° C. for 0.5 hours-1 month to produce the nanoframe of PB or PBA. Also encompassed herein is a method for treating a cancer in a subject in need thereof, which comprises administering an effective amount of a nanocube or a nanoframe of PB or PBA to the subject.

9 Claims, 16 Drawing Sheets

12,502,353 B2

METHODS FOR TREATING CANCERS BY USING NANOFRAMES OF PRUSSIAN BLUE OR AN ANALOGUE THEREOF AND ITS PRODUCTION METHODS

BACKGROUND OF THE INVENTION

1. Field of the Invention

The present disclosure in general relates to the field of chemical synthesis. More particularly, the present disclosure relates to producing a nanoframe of Prussian blue or an analogue thereof. The present disclosure also relates to use of said nanoframe in the preparation of a medicament for the treatment of a cancer in a subject.

2. Description of Related Art

Cancer is a group of diseases involving abnormal cell growth with the potential to invade or spread to other parts of the body. Over the years, cancer has become a leading cause of death worldwide, and for the year of 2020 alone, it accounts for nearly 10 million deaths, or nearly one in six deaths. According to the cancer statistics of the World Health Organization published in 2022, the most common in 2020 (in terms of new cases of cancer) were: breast cancer (2.26 million cases); lung cancer (2.21 million cases); colon and rectum cancer (1.93 million cases); prostate cancer (1.41 million cases); skin cancer (non-melanoma) (1.20 million cases); and stomach cancer (1.09 million cases). Also, the most common causes of cancer death in 2020 were: lung cancer (1.80 million deaths); colon and rectum cancer (916 000 deaths); liver cancer (830 000 deaths); stomach cancer (769 000 deaths); and breast cancer (685 000 deaths). As such, cancer is a severe public health problem to all human beings and is a heavy burden for health care system of a society.

To treat cancer, many treatment options have been developed, and some of them are now employed as current conventional treatments; such treatments include surgery, radiotherapy, and/or systemic therapy (e.g., chemotherapy, hormonal treatments, targeted biological therapies, and the like). Nonetheless, such conventional approaches are often not able to cure cancer effectively, and may even in turn result in adverse effects such as cancer resistance, which is caused by regrowth of the remaining cancer cells not being eradicated by those treatments.

Recently, a new modality of treatment based on reactive oxygen species (ROS), chemodynamic therapy (CDT), has been proposed for treating cancer, which is to yield toxic hydroxyl free radical ($\cdot$OH) following the processes of $H_2O_2 \rightarrow \cdot OH$ by Fenton or Fenton-like reactions, and the $\cdot$OH may selectively kill cancer cells without harming healthy normal cells, by virtue of the fact that $H_2O_2$ is overproduced in cancer cells. Unfortunately, the reaction kinetics driven by endogenous $H_2O_2$ is not sufficient to produce sustainable ROS to achieve the therapeutic effect of CDT, due to the ROS produced therefrom being neutralized by an antioxidative mechanism drawn in the cells. Although a number of catalytic strategies have been proposed to boost $H_2O_2$ concentrations in the tumor microenvironment, these techniques are still flawed in sustaining sufficient $H_2O_2$ in the tumor microenvironment.

On the other hand, the possibility of water-splitting has been considered to be used for CDT; as living tissues contain significant amounts of water for keeping homeostasis, the water per se could potentially be served as a source for continuously producing $H_2O_2$ in tumor cells. However, according to the reports at present, the process for water-splitting requires additionally supplying external energy (e.g., light, ultrasound, or electricity) for successful oxidation, making it greatly limited in terms of real-world application in the clinics.

In view of the foregoing, there exists in the related art a need for an improved approach to allow sustainable self-supply of $H_2O_2$ in tumors, preferably to simply use the tissue-based water to spontaneously produce sustainable self-supply of $O_2$ and $H_2O_2$, so as to achieve the therapeutic effect of CDT, in order for better treatment of cancer.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Accordingly, as embodied and broadly described herein, one aspect of the present disclosure is directed to a method for producing a nanoframe of Prussian blue (PB) or an analogue thereof (Prussian blue analogue, PBA) (hereafter, "the production method"), in which the nanoframe of PB or PBA is able to spontaneously, continuously split water to produce sustainable self-supply of $O_2$ and $H_2O_2$. The method comprises:

(a) mixing a nanocube of Prussian blue or an analogue thereof with an acid solution to form a mixture; and
(b) heating the mixture of the step (a) in an oil bath at 80-100° C. for 0.5 hours-1 month to produce the nanoframe of Prussian blue or an analogue thereof.

According to further embodiments of the present disclosure, the present production method further comprises steps for purifying and washing the nanoframe of PB or PBA. The steps comprise:

(c) centrifuging the nanoframe of Prussian blue or an analogue thereof at 9,000 rpm for 5 minutes;
(d) washing the precipitate of the step (c) with 50-90% ethanol; and
(e) repeating the steps of (c) to (d) for 2-4 times.

According to some embodiments of the present disclosure, the analogue of Prussian blue is cobalt-iron Prussian blue (CFPB), manganese-iron Prussian blue (MFPB), or nickel-iron Prussian blue (NFPB).

According to some optional embodiments of the present disclosure, the nanocube of Prussian blue or an analogue thereof is formed by a co-precipitation method, a hydrothermal method, an electrodeposition method, a microemulsion method, or a microwave method.

Another aspect of the present disclosure is drawn to a method for treating a cancer in a subject in need thereof (hereafter, "the treating method"), comprising administering an effective amount of a nanocube or a nanoframe of Prussian blue or an analogue thereof to the subject, in which, preferably, the nanocube or the nanoframe of Prussian blue or an analogue thereof is encapsulated in a liposome.

Exemplary cancer suitable for treatment by the present treating method includes, but is not limited to, a bladder cancer, a bone cancer, a bone marrow cancer, a brain cancer, a breast cancer, a cholangiocarcinoma, a colon cancer, an esophagus cancer, a gastrointestinal cancer, a gum cancer, a head and neck cancer, a kidney cancer, a liver cancer, a lung cancer, a nasopharyngeal carcinoma, a leukemia, a lymphoma, an ovary cancer, a prostate cancer, a skin cancer, a stomach cancer, a testis cancer, a tongue cancer, and a uterus cancer. In some working examples of the present disclosure, the cancer is a liver cancer. In other working examples of the present disclosure, the cancer is a lung cancer.

Optionally or in addition, the present treating method further comprises administering an additional anti-cancer treatment to the subject, prior to, in conjunction with, or subsequent to applying the nanocube or the nanoframe of Prussian blue or an analogue thereof to the subject, wherein the additional anti-cancer treatment is at least one of a photothermal therapy (PTT), a surgery, a chemotherapy, a radiotherapy, an immunotherapy, or a targeted therapy; preferably, the additional anti-cancer treatment is the photothermal therapy.

According to preferred embodiments of the present disclosure, the nanocube or the nanoframe of Prussian blue or an analogue thereof is encapsulated in a liposome.

According to preferred embodiments of the present disclosure, the liposome having the nanocube or the nanoframe of Prussian blue or an analogue thereof encapsulated therein is administered to the subject in the amount of 10 µg/kg-1 mg/kg. More preferably, the liposome having the nanocube or the nanoframe of Prussian blue or an analogue thereof encapsulated therein is administered to the subject in the amount of 0.1 mg/kg.

Examples of the subject suitable for receiving treatment of the present disclosure include, but are not limited to, mammals. Preferably, the subject is a human.

Many of the attendant features and advantages of the present disclosure will becomes better understood with reference to the following detailed description considered in connection with the accompanying drawings.

BRIEF DESCRIPTION OF THE DRAWINGS

These and other features, aspects and advantages of the present invention will become better understood with reference to the following description, appended claims and the accompanying drawings, where:

FIGS. 1A-1C showcases the structure of the nanoframe of the CFPB (FIG. 1A), the MFPB (FIG. 1B), and the NFPB (FIG. 1C); FIG. 1D is the changes of the Co/Fe ratios during the formation of the CFPB nanoframe by the acid-etching process; FIGS. 1E-1G depict the changes of the absorbance during the formation of the CFPB nanoframe (FIG. 1E), the MFPB nanoframe (FIG. 1F), and the NFPB nanoframe (FIG. 1G) during the acid-etching process; and FIGS. 1H-1J depict the heating performance of the CFPB nanoframe under an 808 nm laser exposure at 0.8 W/cm² (FIG. 1H), under an 808 nm laser exposure at the indicated intensities with a fixed cobalt concentration at 14 ppm (FIG. 1I), and under an 808 nm laser exposure at 0.8 W/cm² with the nanoframe at the indicated concentrations (FIG. 1J). (a.u.: arbitrary unit)

FIGS. 2A-2B depict the oxygen generation from water oxidation by the CFPB nanocube and nanoframe at a fixed cobalt concentration of 14 ppm over times (FIG. 2A), and at the indicated cobalt concentrations at 30 minutes (FIG. 2B); FIGS. 2C-2D depict the $H_2O_2$ generation by the CFPB nanocube and nanoframe at a fixed cobalt concentration of 14 ppm over times (FIG. 2C), and at the indicated cobalt concentrations at 30 minutes (FIG. 2D); FIG. 2E showcases the continuous generation of $H_2O_2$ by the CFPB nanoframe over the indicated times; FIGS. 2F-2G depict the ·OH generation by the CFPB nanocube and nanoframe (with or without encapsulated in the liposome) at a fixed cobalt concentration of 14 ppm over times (FIG. 2F), and at the indicated cobalt concentrations at one minute (FIG. 2G), in which the CFPB nanoframe encapsulated in the liposome is designated as the CFPB@Lipo nanoframe; and FIG. 2H showcases the continuous generation of ·OH by the CFPB nanoframe with a fixed cobalt concentration at 1.4 ppm over the indicated times. All the data were obtained from triplicate experiments. (*$P<0.05$; ***$P<0.001$; ns: no significance).

FIG. 3A presents the ·OH generation in human lung carcinoma cells (A549 cells) by the CFPB or the CFPB@Lipo nanoframes at the indicated concentrations over times; FIG. 3B illustrates the uptake of the CFPB or the CFPB@Lipo nanoframes in the A549 cells; FIG. 3C depicts the cell viability (%) of the A549 cells treated with the CFPB@Lipo nanoframe at the indicated concentrations with or without an 808 nm laser exposure at 0.8 W/cm² for 10 minutes; FIG. 3D illustrates the heating performance of the CFPB@Lipo nanoframe in vitro under an 808 nm laser exposure at 0.8 W/cm²; and FIGS. 3E-3F depict the ·OH generation in the blood (FIG. 3E) and the cell viability (%) of the vascular endothelial cells (FIG. 3F) treated with the CFPB or the CFPB@Lipo nanoframes.

FIGS. 4A-4B depict the tumor growth of the mice orthotopically implanted with human liver cancer cells (Hep G2) after treated with the CFPB@Lipo nanocube or the CFPB@Lipo nanoframe, as compared with the control group (FIG. 4A) or compared in between (FIG. 4B); FIGS. 4C-4E depict the tumor growth inhibition (TGI) rate (FIG. 4C), the body weight (FIG. 4D), and the bar chart for the staining of the hypoxia marker (pimonidazole) (FIG. 4E) of the orthotopic Hep G2-bearing mice in the CFPB@Lipo nanocube or the CFPB@Lipo nanoframe treatment groups; and FIGS. 4F-4G depict the tumor growth (FIG. 4F) and the blood biochemistry analysis (FIG. 4G) of the mice subcutaneously implanted with human lung carcinoma cells (A549) after treated with phosphate-buffered saline (PBS) or the CFPB@Lipo nanoframe, in combination with an 808 nm laser exposure at 0.8 W/cm² for 10 minutes. All the data were obtained from triplicate experiments (n=3). (*$P<0.05$; ***$P<0.001$; ns: no significance; a.u.: arbitrary unit; GOT: aspartate transaminase; GPT: alanine transaminase; ALP: alkaline phosphatase; TBIL: total bilirubin; BUN: blood urea nitrogen; UA: uric acid, and CRE: creatinine).

DESCRIPTION

Figure 1A:
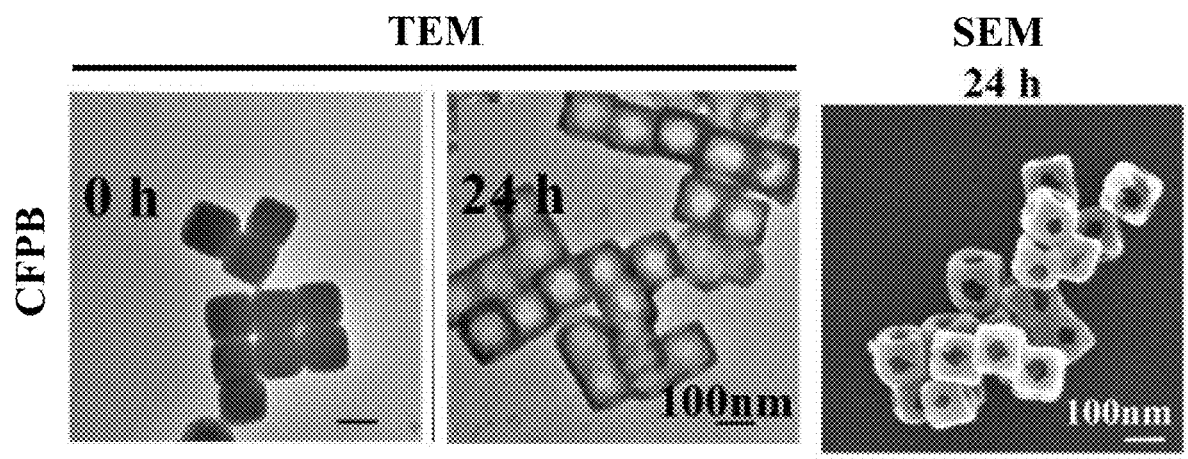
FIGS. 1A-1J depict the structure and the characterization of the nanoframe of PB or PBA in accordance with the embodiments of the present disclosure.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a," "an," and "the" include the plural reference unless the context clearly dictates otherwise. Also, as used herein and in the claims, the terms "at least one" and "one or more" have the same meaning and include one, two, three, or more. The practice of the present invention will employ, unless otherwise indicated, conventional techniques of chemistry, general biology, tumor biology, and the like, which are within the skill of the art. Such techniques are explained fully in the literature.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

As used herein, the terms a "nanocube" and a "nanoframe" (a "nanomaterial") refer to a nanostructure having at least one dimension on the nanoscale, that is, at least one dimension between about 0.1 and 1000 nm. It should be understood that "nanostructures" include, but are not limited to, nanosheets, nanotubes, nanoparticles (e.g., polyhedral nanoparticles), nanospheres, nanowires, nanocubes, nanoframes, nanocages, and combinations thereof, which may be applicable in the present invention. A nanocube may comprise a cube wherein each spatial dimension thereof is on the nanoscale; and a nanoframe is a hollow nanostructure having a structure defined by the edges of the nanocube, formed by etching the nanocube. Also, the terms "nanostructures" and "nanomaterials" as used herein have the same meaning and thus may be used interchangeably.

The term "liposome" as used herein means any vesicles consisting of a hydrophilic core enclosed by at least one lipid layer.

The terms "treatment" and "treating" as used herein may refer to a curative or palliative measure. In particular, the term "treating" as used herein refers to the application or administration of the present nanocube and/or nanoframe of Prussian blue or an analogue thereof or a pharmaceutical composition comprising the same to a subject, who has a symptom or a disease associated with cancer, or a disease or a disorder secondary to the symptom or the disease associated with cancer, with the purpose to partially or completely alleviate, ameliorate, relieve, delay onset of, inhibit progression of, reduce severity of, and/or reduce incidence of one or more symptoms or disease associated with cancer.

The terms "cancer" and "tumor" are used alternatively in the present disclosure and preferably refer to the physiological condition in mammals and especially in humans that is typically characterized by un-regulated cell growth. Cancers in this respect include metastases cancers, and/or drug-resistant cancers.

The term "subject" or "patient" refers to an animal including the human species that is treatable with the pharmaceutically compositions and/or the methods of the present disclosure. The term "subject" or "patient" intended to refer to both the male and female gender unless one gender is specifically indicated. Accordingly, the term "subject" or "patient" comprises any mammal which may benefit from administration of the present nanocube and/or nanoframe of Prussian blue or an analogue thereof. Examples of a "subject" or "patient" include, but are not limited to, a human, a rat, a mouse, a guinea pig, a monkey, a pig, a goat, a cow, a horse, a dog, a cat, a bird, and a fowl. In an exemplary embodiment, the patient is a human.

The term "administered," "administering" or "administration" are used interchangeably herein to refer either directly administering the present nanocube and/or nanoframe of Prussian blue or an analogue thereof, or the present pharmaceutical compositions comprising the nanocube and/or nanoframe of Prussian blue or an analogue thereof.

The term "an effective amount" as used herein refers to an amount effective, at dosages, and for periods of time necessary, to achieve the desired therapeutically desired result with respect to the treatment of symptoms or diseases associated with cancers in a subject. For therapeutic purposes, the effective amount is also one in which any toxic or detrimental effects of the component are outweighed by the therapeutically beneficial effects. The specific effective or sufficient amount will vary with such factors as the particular condition being treated, the physical condition of the patient (e.g., the patient's body mass, age, or gender), the type of mammal or animal being treated, the duration of the treatment, the nature of concurrent therapy (if any), and the specific formulations employed and the structure of the compounds or its derivatives. Effective amount may be expressed, for example, in grams, milligrams or micrograms or as milligrams per kilogram of body weight (mg/kg). Alternatively, the effective amount can be expressed in the concentration of the active component (e.g., the present nanocube and/or nanoframe of Prussian blue or an analogue thereof), such as molar concentration, mass concentration, volume concentration, molality, mole fraction, mass fraction and mixing ratio. Persons having ordinary skills could calculate the human equivalent dose (HED) for the medicament (such as the present nanocube and/or nanoframe of Prussian blue or an analogue thereof) based on the doses determined from animal models. For example, one may follow the guidance for industry published by US Food and Drug Administration (FDA) entitled "Estimating the Maximum Safe Starting Dose in Initial Clinical Trials for Therapeutics in Adult Healthy Volunteers" in estimating a maximum safe dosage for use in human subjects.

II. Description of the Invention

The present disclosure aims to provide a means for treating cancer by having sustainable self-supply of $H_2O_2$ in tumors, with the aid of a nanocube or a nanoframe of PB or PBA to spontaneously and continuously split the water resided in tissues, so as to achieve the therapeutic effect of CDT. Further, a synergistic effect is achieved when the nanocube or the nanoframe of PB or PBA is used in combination with a photothermal therapy in treating cancer. For at least the above effects, the present invention may achieve better therapeutic effect on cancers.

1. The Production Method

Accordingly, the first aspect of the present disclosure is directed to a method for producing a nanoframe of Prussian blue or an analogue thereof for use in treating cancer; the method is in general based on an acid-etching reaction. According to the embodiments of the present disclosure, the production method comprises the steps of:
   (a) mixing a nanocube of Prussian blue or an analogue thereof with an acid solution to form a mixture; and
   (b) heating the mixture of the step (a) in an oil bath at 80-100° C. for 0.5 hours-1 month to produce the nanoframe of Prussian blue or an analogue thereof.

The present production method is characterized in using the nanocube of Prussian blue (PB) or an analogue thereof (PBA) as a starting material to produce the corresponding nanoframe, in which the analogue of PB (i.e., PBA) may be cobalt-iron Prussian blue (CFPB), manganese-iron Prussian blue (MFPB), or nickel-iron Prussian blue (NFPB). The nanocube (i.e., a cube with an edge length of 150 nm or less) may be formed by any conventional methodology known in the art, for example, a co-precipitation method, a hydrothermal method, an electrodeposition method, a microemulsion method, or a microwave method. According to some embodiments of the present disclosure, the nanocube of PB used herein is formed by a hydrothermal method, in which polyvinylpyrrolidone (PVP) is mixed with potassium hexacyanoferrate(III) in an acid solution (e.g., a hydrogen chloride (HCl) solution), the mixture is then autoclaved and heated at 80° C. for 1 hour; the resulting product is dispersed into ethanol-water co-solvent to give the final product, that is, the nanocube of PB. According to other preferred embodiments of the present disclosure, the nanocube of PBA used herein is be formed by a co-precipitation method, in which metallic ions (e.g. cobalt(II) acetate, manganese(II) acetate, or nickel(II) acetate tetrahydrate) are mixed with potassium hexacyanoferrate(III) in an aqueous solution of trisodium citrate dehydrate in an ice bath; the ratio of the metallic ions to the potassium hexacyanoferrate(III) may be adjusted as needed to give the nanocube of PBA with a desired ion ratio. The resulting product is then centrifuged, washed, and dispersed in deionized water for storage for later use.

The present production method commences by mixing the nanocube of PB or PBA with an acid solution to form a mixture (step (a)). Examples of said acid solution include, but are not limited to, an acid solution of perchloric acid ($HClO_4$), hydroiodic acid (HI), hydrobromic acid (HBr), HCl, sulfuric acid ($H_2SO_4$), p-toluenesulfonic acid ($CH_3C_6H_4SO_3H$), nitric acid ($HNO_3$), hydronium ion ($H_3O^+$ or $H^+$), chloric acid ($HClO_3$), bromic acid ($HBrO_3$), perbromic acid ($HBrO_4$), iodic acid ($HIO_3$), and periodic acid ($HIO_4$). In one preferred example, the acid solution is an HCl solution.

Then, in the step (b), the mixture of the step (a) is subjected to heating in an oil bath at 80-100° C. for 0.5 hours-1 month to produce the nanoframe of PB or PBA. According to embodiments of the present disclosure, the mixture of the step (a) is heated at 80-100° C., such as 80, 81, 82, 83, 84, 85, 86, 87, 88, 89, 90, 91, 92, 93, 94, 95, 96, 97, 98, 99, or 100° C.; preferably, the mixture of the step (a) is heated at 85-95° C., such as 85, 86, 87, 88, 89, 90, 91, 92, 93, 94, or 95° C.; more preferably, the mixture of the step (a) is heated at 90° C. Also, the duration for heating in the present production method is 0.5 hours-1 month, for example, 0.5, 1, 2, 3, 4, 5, 6, 7, 8, 9, 10, 11, 12, 13, 14, 15, 16, 17, 18, 19, 20, 21, 22, 23, 24 hours (=1 day), 2, 3, 4, 5, 6, 7, 8, 9, 10, 11, 12, 13, 14, 15, 16, 17, 18, 19, 20, 21, 22, 23, 24, 25, 26, 27, 28, 29, or 30 days (=1 month). Depending on the nature of the specified nanocube of PB or PBA, the optimal duration for heating for the nanocube to form its corresponding nanoframe may be adjusted according to the actual need.

Optionally or in addition, after fabrication of the nanoframe of PB or PBA, the nanoframe may be purified by following steps of: (1) centrifuging at 5,000-15,000 rpm (preferably, at 9,000 rpm) for 1-20 minutes (preferably, for 5 minutes), and collecting the precipitate (step (c)); (2) washing the resulting precipitate with 50-90% ethanol (such as 50%, 55%, 60%, 65%, 70%, 75%, 80%, 85%, or 90%) in deionized water (step (d)); and (3) repeating the steps of (c) to (d) for 2-4 times, so as to obtain the purified nanoframe (step (e)).

Further, the produced nanoframe may be examined to confirm if the structure of the nanoframe is successfully formed, via any applicable methods known in the art or via analysis methods as described in more detail hereinbelow. The produced nanoframe may be examined via directly microscopic examination (e.g., examination by scanning electron microscope (SEM), field emission scanning electron microscope, scanning transmission electron microscopy, transmission electron microscope (TEM), energy filtered transmission electron microscope, scanning probe microscope, scanning tunneling microscope, or atomic force microscope), change of the metal-iron ratio (applicable for examining the nanoframe of PBA), change of the absorbance of visible light (about 400-900 nm), induction of heating by laser exposure (i.e., reflecting the photothermal effect), or a combination thereof.

2. The Treating Method

Another aspect of the present disclosure is drawn to a method for treating a cancer in a subject in need thereof. The method comprises administering an effective amount of the present nanocube or nanoframe of PB or PBA to the subject.

According to some preferred embodiments of the present disclosure, the nanoframe of PB or PBA is encapsulated in a liposome. It would be appreciated that the liposome may be made of any suitable lipids, wherein the molar ratio among the chosen lipids may be adjusted as needed to ensure a clear normal liposome solution is formed but the ratio is otherwise not critical. Optionally or in addition, the liposome may be positively or neutrally charged, via mixing proper types of lipids until a desired final charge is reached, so as to produce a liposome with a desired affinity to cells. Non-limiting examples of the lipids suitable for making the liposome include natural phospholipids, phosphatidylcholine, phosphatidylserine, phosphatidylethanolamine, phosphatidylinositol, phosphatidylglycerol, polyethylene glycol (PEG), poly(lactic-co-glycolic acid) (PLGA), polyethylene glycol-poly lactic acid-co-glycolic acid (PEG-PLGA), linoeic (LA), cholesterol, acid 1,2-dimyristoyl-rac-glycero-3-methoxypolyethylene glycol-2000 (DMG-PEG2000), 1,2-dioleoyl-sn-glycero-3-phosphate (DOPA), 1,2-dioleoyl-sn-glycero-3-phosphocholine (DOPC), 1,2-dioleoyl-sn-glycero-3-phosphoethanolamine (DOPE), 1,2-dioleoyl-sn-glycero-3-phosphoethanolamine-N-[methoxy(polyethylene glycol)-2000] (DOPE-PEG2000), 1,2-dioleoyl-3-trimethyl-ammonium-propane (DOTAP), 1,2-distearoyl-sn-glycero-3-phosphoethanolamine (DSPE), 1,2-distearoyl-sn-glycero-3-phosphoethanolamine-N-[methoxy(polyethylene glycol)-2000] (DSPE-PEG), and 1,2-distearoyl-sn-glycero-3-phosphoethanolamine-N-(polyethylene glycol)-thiol (DSPE-PEG-SH or SH-PEG-DSPE). The liposome may be prepared via any suitable method known to the art (e.g., an extrusion method). In one working example, the liposome having a net positive charge is made by mixing DOPC and DOPE in the molar ratio of 2.3:1

Encapsulation of the present nanocube or nanoframe of PB or PBA into the liposome may be achieved by procedures well-known in the art, for example, by mixing the nanocube or nanoframe with the above liposome solution, and then subjecting the mixture to sonication and cooling.

As would be appreciated, examples of cancers that are suitable for treating by the present treating method are not particularly limited; non-limiting examples of such cancers include, but are not limited to, a bladder cancer, a bone cancer, a bone marrow cancer, a brain cancer, a breast cancer, a cholangiocarcinoma, a colon cancer, an esophagus cancer, a gastrointestinal cancer, a gum cancer, a head and neck cancer, a kidney cancer, a liver cancer, a lung cancer, a nasopharyngeal carcinoma, a leukemia, a lymphoma, an ovary cancer, a prostate cancer, a skin cancer, a stomach cancer, a testis cancer, a tongue cancer, and a uterus cancer. According to certain example, the cancer treatable by the present treating method is a liver cancer. According to another example, the cancer treatable by the present treating method is a lung cancer.

Optionally, the present treating method further comprises administering an additional anti-cancer treatment to the subject, prior to, in conjunction with, or subsequent to administering to the subject the present nanocube or nanoframe of PB or PBA, in which the additional anti-cancer treatment is at least one of a photothermal therapy, a surgery, a chemotherapy, a radiotherapy, an immunotherapy, or a targeted therapy. In one preferred example, the present treating method further comprises administering the additional anti-cancer treatment of the photothermal therapy (i.e., providing a laser irradiation) in combination with the present nanocube or nanoframe of PB or PBA, as the present nanocube or nanoframe of PB or PBA exhibits superb heating performance (i.e., having higher thermal conductivity) upon laser irradiation, accordingly, the combined treatment results in a synergistic inhibitory effect on cancers.

The additional anti-cancer treatment that may be used in combination with the present treating method is the chemotherapy, in which a chemotherapeutic agent is administered prior to, in conjunction with, or after the administration of the present nanocube or nanoframe of PB or PBA, to the subject. Examples of chemotherapeutic agent include, but are not limited to, actinomycin D, aminoglutethimide, amsacrin, anastrozol, anthracycline, bexaroten, bleomycin, buselerin, busulfan, camptothecin derivates, capecitabin, carboplatin, carmustine, chlorambucil, cisplatin, cladribin, cyclophosphamide, cytarabin, cytosinarabinoside, dacarbacin, dactinomycin, daunorubicin, docetaxel, doxorubicin, epirubicin, estramustine, etoposid, exemestan, fludarabin, fluorouracil, formestan, gemcitabin, goselerin, hycamtin, idarubicin, ifosfamid, imatinib, irinotecan, letrozol, leuprorelin, lomustin, melphalan, mercaptopurine, methotrexate, miltefosin, mitomycine, mitoxantron, nimustine, oxaliplatin, paclitaxel, pentostatin, procarbacin, temozolomid, teniposid, testolacton, thiotepa, thioguanine, topotecan, treosulfan, tretinoin, triptorelin, trofosfamide, vinblastine, vincristine, vindesine, and vinorelbine.

Alternatively, the additional anti-cancer treatment that may be used in combination with the present treating method is immunotherapy, in which an immunotherapeutic agent is administered prior to, in conjunction with, or after the administration of the present nanocube or nanoframe of PB or PBA to the subject. Non-limiting examples of the immunotherapeutic agent include, but are not limited to, an anti-PD-1 antibody (e.g., pembrolizumab or nivolumab), an anti-PD-L1 antibody (e.g., atezolizumab, avelumab, or durvalumab), an anti-CTLA-4 antibody (e.g., ipilimumab or tremelimumab), riluzole, trigriluzole, IFN-γ, IL-2, IL-15, IL-23, M-CSF, GM-CSF, TNF, CD80, CD86, and ICAM-1.

The additional anti-cancer treatment that may be used in combination with the present method is targeted therapy, in which a targeted agent is administered prior to, in conjunction with, or after the administration of the present nanocube or nanoframe of PB or PBA to the subject. Examples of the targeted agent include, but are not limited to, bortezomib, dasatinib, erlotinib, gefitinib, lapatinib, nilotinib, sorafenib, sunitinib, tofacitinib, crizotinib, venetoclax, obatoclax, navitoclax, gossypol, olaparib, rucaparib, niraparib, talazoparib, perifosine, apatinib, vemurafenib, dabrafenib, trametinib, vismodegib, sonidegib, salinomycin, vintafolide, temsirolimus, everolimus, rituximab, trastuzumab, alemtuzumab, cetuximab, panitumumab, bevacizumab, and ipilimumab.

According to the present treating method, the present nanocube or nanoframe of PB or PBA is administered to the subject in the amount of about 0.1 μg/kg to 100 mg/kg body weight of the subject, such as 0.1, 0.2, 0.3 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 150, 200, 250, 300, 350, 400, 450, 500, 550, 600, 650, 700, 750, 800, 850, 900, 950, 1,000 μg/kg (=1 mg/kg), 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mg/kg body weight of the subject; preferably, about 1 μg/kg to 10 mg/kg body weight of the subject; more preferably, about 10 μg/kg to 1 mg/kg body weight of the subject. In one working example, the present nanocube or nanoframe of PB or PBA is administered to the subject in the amount of about 0.1 mg/kg. The dose can be administered in a single aliquot, or alternatively in more than one aliquot. The skilled artisan or clinical practitioner may adjust the dosage or regime in accordance with the physical condition of the patient or the severity of the diseases.

It should be noted that during the term of the present treatment, different therapies or therapeutics may be administered to the subject at different doses, time intervals, via different routes. The doses and time intervals may vary with factors such as described above, and are dependent on the professional considerations of the practitioner; and the routes may be via oral, enteral, buccal, nasal, transdermal, transmucosal, intravenous, intraperitoneal, intraarterial, intracutaneous, subcutaneous, and intramuscular routes.

Basically, the subject treatable by the present method is a mammal; preferably, the subject is a human.

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent.

EXAMPLES

Materials and Methods

1. Cell Cultures

A549 cells (a human cancer cell line of alveolar basal epithelial origin) were cultured in Dulbecco's modified Eagle medium (DMEM) containing 0.1 mM non-essential amino acids (NEAA), 1% penicillin/streptomycin (P/S), and 10% fetal bovine serum (FBS); Hep G2-Red-Fluc cells (a human liver cancer cell line) were maintained in high glucose DMEM (Caisson), supplemented with 10% FBS and 1% P/S; HUV-EC-C cells (a human endothelial cell line) were cultured in F-12K medium containing 0.03 mg/ml endothelial cell growth supplement (EGCS), 0.1 mg/ml heparin, and 10% FBS. All the cells were maintained at 37° C. in a humidified atmosphere of 5% $CO_2$.

2. Synthesis of the CFPB, the MFPB, and the NFPB Nanocubes

A first solution was prepared: 0.05 g of potassium hexacyanoferrate(III) ($K_3[Fe(CN)_6]$, 99%) was dissolved in 30 ml of distilled deionized water (DDW). A second solution for each nanocube was prepared as follows: for the CFPB nanocube, 0.075 g of cobalt(II) acetate ($C_4H_6CoO_4$, 99%) and 0.147 g of trisodium citrate dehydrate ($C_6H_5Na_3O_7 \cdot 2H2O$, 99%) were dissolved in another 20 ml of DDW; for the MFPB nanocube, 0.0733 g of manganese (II) acetate ($C_4H_6MnO_4$, 98%) and 0.294 g of trisodium citrate dihydrate were dissolved in another 20 ml of DDW; and for the NFPB nanocube, 0.1054 g of nickel(II) acetate tetrahydrate ($C_4H_6NiO_4 \cdot 4H2O$, 98%) and 0.147 g of trisodium citrate dihydrate were dissolved in another 20 ml of DDW. Then, the first solution was mixed with each of the second solution, respectively, and stirred in ice bath. After 15 minutes (except for the NFPB nanocube, after 24 hours), the precipitates were harvested by centrifugation at 9,500 rpm for 5 minutes, and washed with 50%/50% of ethanol/deionized water (DW) (except for the MFPB nanocube, washed with 90%/10% of ethanol/DW). The washing-centrifugation run was conducted for at least three times. Finally, each of the nanocubes was dispersed in DW for later use.

3. Synthesis of the PB Nanocube 6.0 g of polyvinylpyrrolidone (PVP, $(C_6H_9NO)_n$, M.W.=55000) was dissolved completely in 60 ml of 0.1M HCl solution. Then, 0.05 g of potassium hexacyanoferrate (III) was added to the solution, before subjecting the solution to autoclave and then being heated at 80° C. for 1 hour. The solution was collected and centrifuged at 14,000 rpm for 5 minutes. The supernatants were removed and the precipitates were redispersed in ethanol-water co-solvent. The washing-centrifugation run was conducted for at least three times. Finally, the PB nanocubes were dispersed in DW for later use.

4. Acid-Etching to Produce the CFPB, the MFPB, the NFPB, and the PB Nanoframes

The CFPB, the MFPB, the NFPB, and the PB nanocubes (400 ppm in Fe ion concentration) were independently dissolved in 2 ml of DDW, and then each of which was mixed with 14 ml of 0.01M HCl. The solutions were stirred and heated in an oil bath at 90° C. for various periods of time: for the CFPB nanocube, 0.5, 3, 6, 16, and 24 hours; for the MFPB nanocube, 5, 10, 15, 20, 40 minutes, and 1 day; for the NFPB nanocube, 1, 5, 12, and 15 days; and for the PB nanocube, 1 day. After the acid-etching reaction, the solutions were collected and centrifuged at 9,000 rpm for 5 minutes. The supernatants were removed and the precipitates were redispersed in 50%/50% of ethanol/DW (except for the MFPB nanocube, redispersed in 90%/10% of ethanol/DW). The washing-centrifugation run was conducted for at least three times. Finally, each of the nanoframes was dispersed in DW for later use.

5. Preparation of Liposomes

The liposomes were prepared by an extrusion method. Briefly, 100 mg of DOPC and DOPE powders were respectively dispersed in 5 ml of chloroform as lipid stock solutions. 0.252 ml of DOPC stock solution and of 0.059 ml DOPE stock solution were mixed and then dried by purging $N_2$ gas to produce a multi-layered lipid film. Thus, the ratio of DOPC:DOPE is about 2.3:1. 0.8 ml of PBS was added to completely dissolve the lipid film to obtain a lipid working solution, which was then subjected to extrusion by an extruder (Avanti Polar Lipids, Inc.) with a polycarbonate membrane with pore size of 100 nm. The lipid working solution was drawn into a syringe that was connected with the extractor, and the extrusion was carried out by extruding forward and reverse at least for five runs to obtain liposomes having monodisperse 100 nm. The resulting liposomes were stored at 4° C. for later use.

6. Preparation of CFPB@Lipo Nanoframe 18 mg of the above liposomes were added to 1 ml of CFPB nanoframe (125 ppm in cobalt ion concentration) in PBS. For preparation of the CFPB@Lipo-RB nanoframe, an additional 0.1 mg of rhodamine B (RB) was added into the above solution. The mixture was ultrasonic sonicated at room temperature for 15 minutes, and cooled for 5 minutes. The sonication-cooling run was performed for three times, so as to give CFPB nanoframes with lipid membranes well-coated thereon (i.e., the CFPB@Lipo or the CFPB@Lipo-RB nanoframes). The resulting CFPB@Lipo or the CFPB@Lipo-RB nanoframes were washed by PBS for at least three times, and stored at 4° C. for later use.

7. Absorbance Detection

During the reaction of acid-etching, the solutions containing the CFPB, the MFPB, the NFPB, and the PB nanocubes or nanoframes at the above indicated time points were collected and measured for their absorbance with a spectrometer, respectively.

8. Heating Performance of the Nanomaterials Upon Laser Irradiation

The change of temperature of the nanomaterials in the solutions was recorded by a digital thermometer. For evaluation of heating performance, 100 μl of water, the CFPB nanocube, or the CFPB nanoframe (14 ppm in cobalt ion concentration) were exposed to an 808 nm diode laser irradiation at a power density of 0.8 W/cm². For evaluation of photothermal effect in cell culture, A549 cells (8,000 cells/well) were treated with the indicated concentrations of the CFPB@Lipo nanoframes (14, 28, and 56 ppm in cobalt ion concentration) and incubated for 4 hours, and then the cultures were irradiated with an 808 nm diode laser irradiation at 0.8 W/cm² for 10 minutes.

9. Evaluation of Oxygen ($O_2$) Generation

Prior to $O_2$ measurement, all the test tubes were treated with a purge of $N_2$ to remove $O_2$ therein. [Ru(dpp)$_3$]Cl$_2$ is an indicator for detecting the generation of $O_2$. 100 μl of [Ru(dpp)$_3$]Cl$_2$ (40 μM) was added to 0.9 ml of $H_2O$ (as a control group) or to 0.9 ml of the CFPB nanocube or the CFPB nanoframe respectively at the indicated concentrations (0.14, 0.7, 1.4, 7, and 14 ppm in cobalt ion concentration) at 37° C. in dark for 1, 3, 5, 10, 15, and 30 minutes. Then, the above samples were centrifuged at 9,500 rpm for 5 minutes to collect the supernatants containing the [Ru(dpp)$_3$]Cl$_2$, which reflected the presence of oxygen by measuring the relative ratio of the fluorescence intensity emitted therefrom (ex/em: 455/613 nm). All the experiments were performed in triplicate.

10. Quantitation of Hydrogen Peroxide ($H_2O_2$) Generation

Quantitation of $H_2O_2$ generation was achieved by the chemical reaction: $H_2O_2$ reacts with potassium iodide (KI) to generate yellow $I_3^-$; and then quantified by measuring absorbance at 350 nm with a spectrometer. A calibration curve was established for assisting precise quantification of $H_2O_2$ generation, in which 1 ml of solutions containing 0.5M KI (excess) and $H_2O_2$ at the indicated concentrations (1, 2, 5, 10, 20, 50, and 100 μM) was reacted for 10 minutes to produce $I_3^-$; and the absorbance of $I_3^-$ at 350 nm reflects the corresponding concentration of $H_2O_2$.

All the procedures were conducted oxygen free by treating a purge of $N_2$ to all the test tubes containing the following reactants, before carrying out the actual reaction: (1) 100 μl of KI (0.1 M) was added to 0.9 ml of the CFPB nanocube or the CFPB nanoframe, each of which was at the concentration of 14 ppm, and reacted for the indicated times (1, 3, 5, 10, 15, and 30 minutes) in dark; or (2) 100 μl of KI (0.1 M) was added to 0.9 ml of the CFPB nanocube or the CFPB nanoframe at the indicated concentrations (0.14, 0.7, 1.4, 7, and 14 ppm in cobalt ion concentration), and reacted for 30 minutes in dark. The solutions were centrifuged at 9,500 rpm for 5 minutes to collect the yellow supernatants (containing $I_3^-$), before subjecting to measurement for the absorbance of $I_3^-$. The precise quantification of $H_2O_2$ generation was obtained by interpolation or extrapolation against the calibration curve.

11. Evaluation of Hydroxyl Free Radical (·OH) Generation

An aminophenyl fluorescein (APF, $C_{26}H_{17}NO_5$, 98%) dye is an indicator for determining the generation of ·OH. 0.1 ml of APF (10 μM, in PBS) was added to the CFPB nanocube, CFPB nanoframe, or CFPB@Lipo nanoframe at the indicated concentrations (0, 0.14, 0.7, 1.4, 7, 14, and 28 ppm in cobalt ion concentration), and reacted for the indicated time points (1, 3, 5, 10, 15, and 30 minutes) in dark. Where an additional photothermal treatment was needed, the solutions were irradiated with 808 nm diode laser at the power density of 0.8 W/cm² for 10 minutes. Then, the fluorescence intensity of the APF dye (ex/em: 490/520 nm) was measured by a microplate reader. The relative ratio of the fluorescence intensity was calculated by the fluorescence intensity of the APF dye+the nanomaterials measured at the indicated time points divided by the fluorescence intensity of the pure APF dye. All the experiments were performed in triplicate.

For the evaluation of ·OH in cells, A549 cells were seeded 8,000 cells/well in 96-well microplates and incubated for 24 hours, followed by adding APF dye to reach a final concentration of 10 μM for 10 minutes. The CFPB or the CFPB@Lipo nanoframes at the indicated concentrations (0, 0.14, 0.7, 1.4, 7, 14, and 28 ppm in cobalt ion concentration) were added to the cultures and incubated for 10 minutes, 4 hours, and 20 hours. Then, the fluorescence intensity of the APF dye was measured by a microplate reader. All the experiments were performed in triplicate.

For ·OH evaluation in blood, solutions containing 10 μM of APF, 2% red blood cells, and the CFPB or the CFPB@Lipo nanoframes at the indicated concentration (0, 0.14, 0.7, 1.4, 7, and 14 ppm in cobalt ion concentration) were incubated in dark at 37° C. for 5 minutes. The fluorescence intensity of the APF dye was measured at 520 nm by a microplate reader, and the relative ratio of fluorescence intensity was calculated to reflect the ·OH level generated in blood. All the experiments were performed in triplicate.

12. Cellular Uptake of the CFPB and the CFPB@Lipo Nanoframes 0.8×10⁴ A549 cells/well were grown in 96-well microplates for 24 hours. The CFPB or the CFPB@Lipo nanoframes (50 ppm in cobalt ion concentration) were added in the wells and incubated at 37° C. for 4 hours. The media were removed, and the cells were washed by PBS for at least three times, followed by immersing the cells in aqua regia for 1 day. The cobalt ion concentration in the aqua regia was determined by atomic absorption (AA) measurements.

13. Cells Viability after Laser Exposure

A549 cells (8,000 cells/well) were seeded in 96-well microplates and incubated for 24 hours. The medium was removed, and then a fresh medium with the CFPB@Lipo nanoframe at the indicated concentrations (0, 0.14, 0.7, 1.4, 7, 14, 28, and 56 ppm in cobalt ion concentration) was added to the culture. For cells without a photothermal treatment (the control group), the cells were incubated for 24 hours, and washed with fresh medium for at least 3 times. For cells with an additional photothermal treatment (the test group), at 4 hours after addition of the CFPB@Lipo nanoframes to the cells, the cells were irradiated with 808 nm diode laser at a power density of 0.8 W/cm² for 10 minutes, and then incubated for 20 hours, followed by a wash with fresh medium for at least 3 times. Then, the cells were cultured in a medium containing 10% 3-(4,5-dimethylthiazol-2-yl)-2,5-diphenyl tetrazolium bromide (MTT) reagent for 4 hours, and the absorbance at 570 nm was determined by a microplate reader. All the experiments were performed in quadruplicate.

14. Animal Models

For orthotopic animal models: All of the experimental protocols involving live animals were reviewed and approved by the Institutional Animal Care and Use Committee (IACUC No. 2021031802) of Chang Gung Memorial Hospital. The NOD/SCID nude mice (male, 6-8 weeks old, the Laboratory Animal Center of the National Science Council) were used in the present study. 2×10⁶ Hep G2-Red-Fluc cells in 20 μl PBS were orthotopically implanted into the right or the left lobe of the liver via a midline abdominal incision. The growth of the tumor in the mice were monitored by bioluminescence imaging, which was achieved via injecting D-luciferin (Biosynth Carbosynth) to the mice, and recording the bioluminescence flux with an in vivo imaging system (IVIS, PerkinElmer, Waltham, MA) with a bioluminescence mode. Data analysis was performed using analytical software Living Image software.

For subcutaneous animal models: All the animal treatments and the surgical procedures were conducted following the guidelines of the National Cheng Kung University (NCKU) Laboratory Animal Center (Tainan, Taiwan), and all of the experimental protocols involving live animals were reviewed and approved by the Animal Experimentation Committee of the NCKU. The NOD/SCID (male, 6-8 weeks old) mice were subcutaneously implanted with $1\times10^6$ A549 cells in 100 μl medium into their back side. After 2 weeks, when the tumor volume reached about 100 mm$^3$, the tumor-bearing mice were randomly divided into three groups (n=3 for each group).

For treatment, the tumor-bearing nude mice were injected via tail vein with the CFPB@Lipo nanocube (100 ppm (about 1 mg/kg)) or the CFPB@Lipo nanoframe (100 ppm (about 1 mg/kg)), or PBS per mouse. Live images of the mice were acquired via D-luciferin injection followed by in vivo imaging, as described above, at the indicated time points, and the recorded bioluminescence flux was used to assess the tumor growth. The tumor growth inhibition (TGI) rate was calculated as follows: TGI=[1−(relative tumor volume in the treatment group)/(relative tumor volume in the control group)]×100%. Data analysis was performed using Living Image software. A pseudo color image representing the spatial distribution of photon counts were projected onto the photographic image.

15. Hypoxia Staining in the Tumor Tissues

For tissue hypoxia staining, the mice were i.p. injected with 1.8 mg of pimonidazole HCl in saline (Hypoxyprobe™-1) for 1 hour prior to sacrificing. The tumor tissues were paraffin-embedded and sliced into 4 μm in thicknesses. The sections were deparaffinized, rehydrated, washed in PBS, and stained with IgG1 mouse monoclonal antibody. The sections were observed under an optical microscope (Pannoramic MIDI, 3D HISTECH Ltd.).

16. Statistics

Data were presented as mean±S.D. For all statistical analyses, p-value≤0.05 was considered significant. Calculations, diagrams, and statistical analyses were generated by using the softwares Origin 9 and Excel, and the p-values were calculated by one-way ANOVA.

Figure 1B:
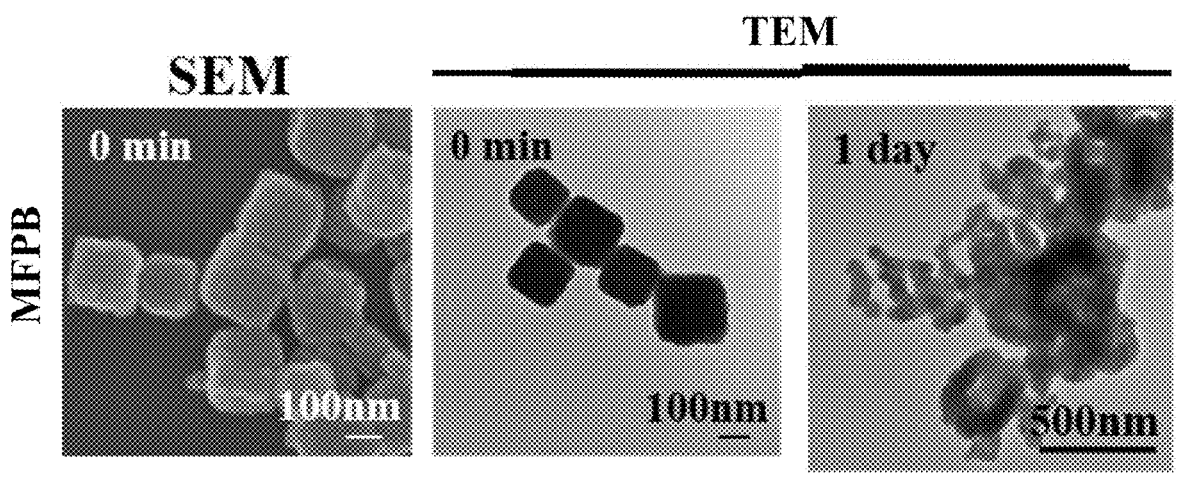
Figure 1C:
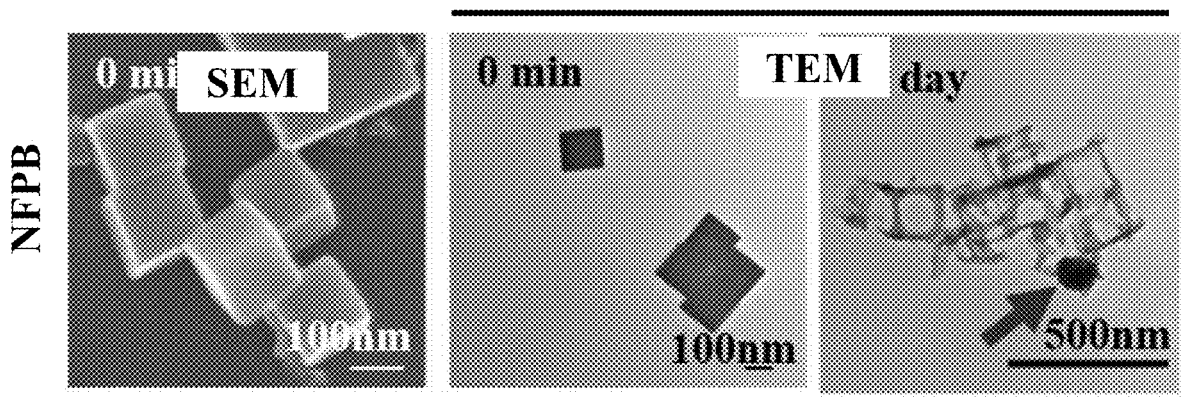

Example 1 Production and Characterization of the Nanocubes and the Nanoframes of PB or PBA The production of the present PBA nanocubes (i.e., the CFPB, the MFPB, and the NFPB nanocubes) or the PB nanocubes was as described in the section of "Materials and Methods." Basically, the individual PBA nanocubes were formed by co-precipitating cobalt ions, manganese ions, nickel ions, respectively, with hexacyanoferrate ions in an acidic environment (trisodium citrate dehydrate); and the PB nanocube was formed by immersing hexacyanoferrate ions in an acidic solution containing PVP. The resulting nanocubes had a monodispersed cubic appearance (a well-defined crystalline structure) with an edge length of about 112 nm under TEM or SEM inspection (FIG. 1A, left panel; FIG. 1B, left and middle panels; FIG. 1C, left and middle panels), which were used as the starting materials for producing their corresponding nanoframes.

Figure 1D:
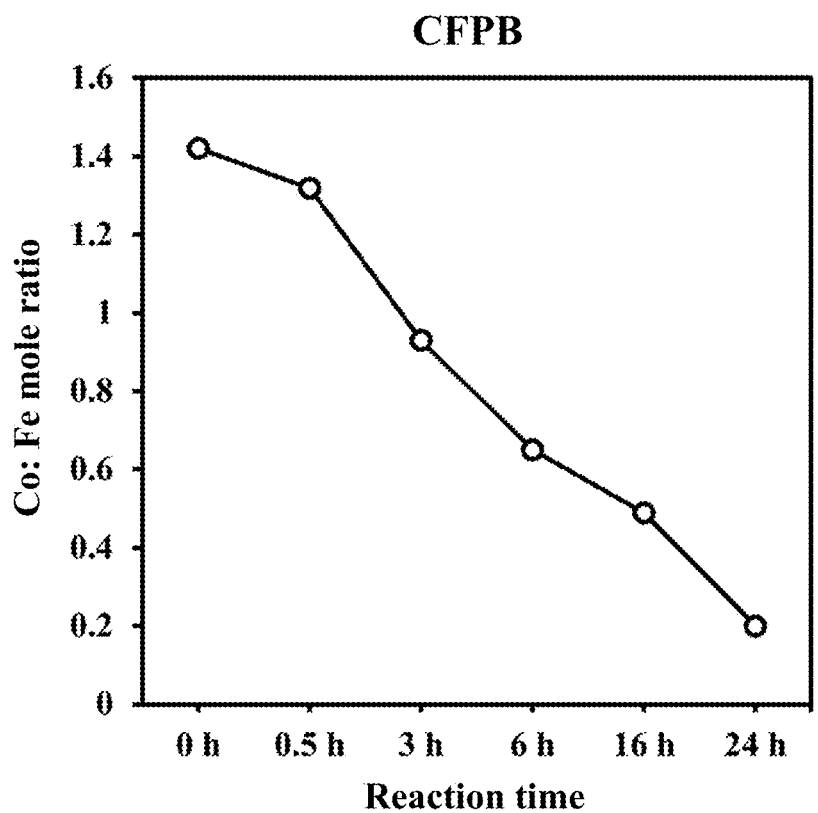

The present PBA nanoframes were also produced by the acid-etching approach described in the section of "Materials and Methods." The thus-produced nanocubes were subjected to acidic corrosion with 0.01 M HCl at 90° C. in an oil bath for a sufficient period of time (ranging from 1-15 days, depending on the chemical composition of the individual nanocube). The resulting nanoframes were examined under TEM or SEM to scrutinize the morphological change thereof, and the TEM or SEM images were as shown in FIG. 1A, middle and right panels; FIG. 1B, right panel;

FIG. 1C, right panel, exhibiting a hollow nanostructure defined by the edges of the nanocube. Note that the PB nanocube was relatively resistant to acidic corrosion; no visible morphological change was observed after 24-hour acidic corrosion (data not shown). During the acid-etching process for the CFPB nanoframe, the Co/Fe ratios (analyzed by atomic absorption (AA) measurements) had changed gradually in accordance with the specific etching stages, thereby forming a correlation between the composition change (i.e., the Co/Fe ratios) and the structural change (FIG. 1D and Table 1). As summarized in Table 1, the Co/Fe ratio decreased steadily from the initial 1.42 to 0.20 after 24 hours, indicating the loss of cobalt ions during etching, which may serve as a working indicator for the structural change from nanocube to nanoframe.

TABLE 1

The Co/Fe ratios during the acid-etching process

| Acid-etching time (hours) | Co:Fe molar ratio |
| --- | --- |
| 0 | 1.42:1 |
| 0.5 | 1.32:1 |
| 3 | 0.93:1 |
| 6 | 0.65:1 |
| 16 | 0.49:1 |
| 24 | 0.20:1 |

Figure 1E:
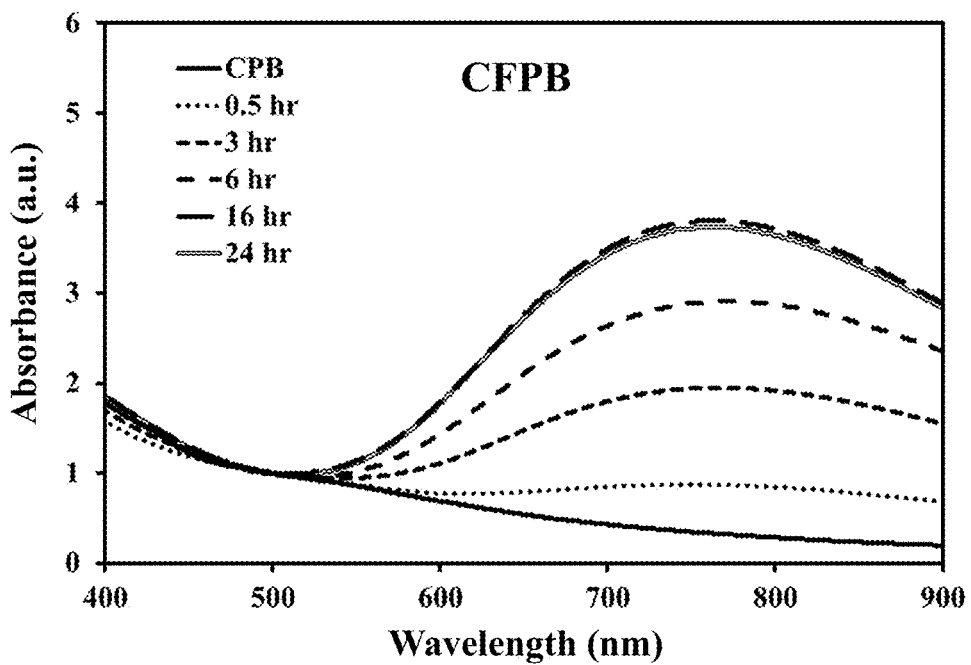
Figure 1F:
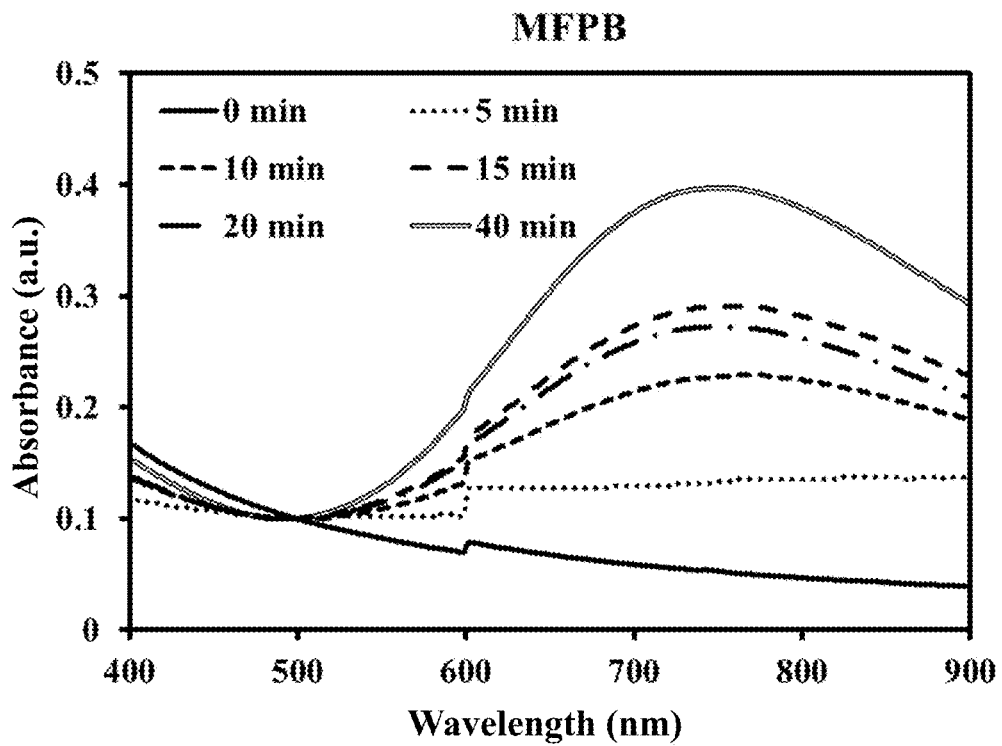
Figure 1G:
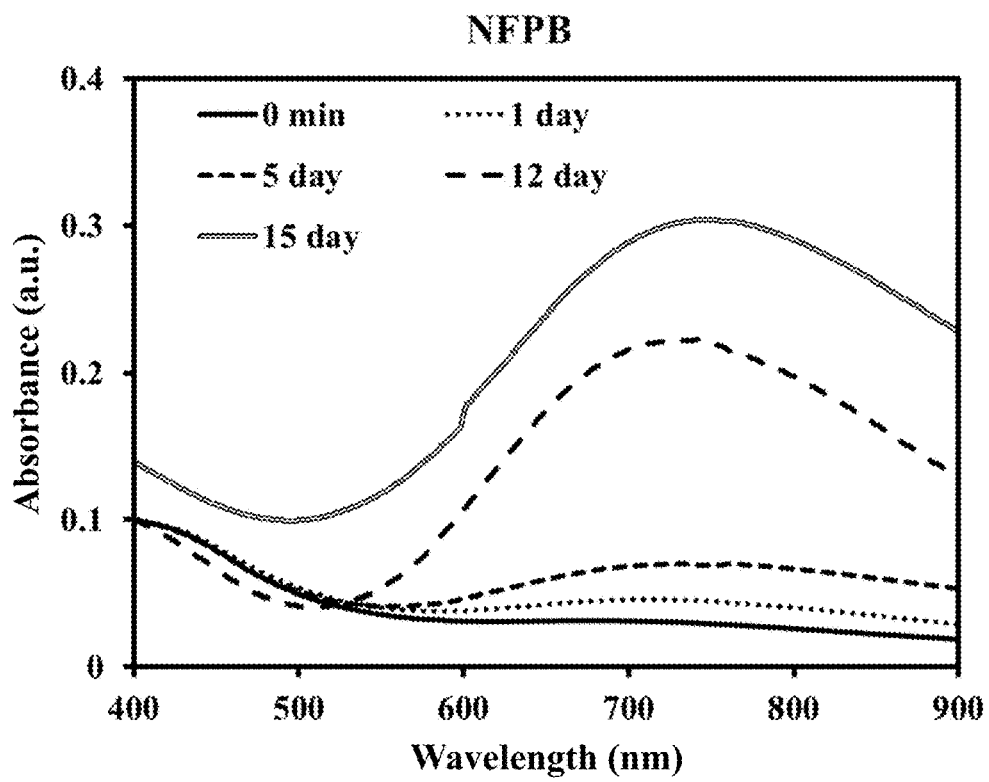
Figure 1H:
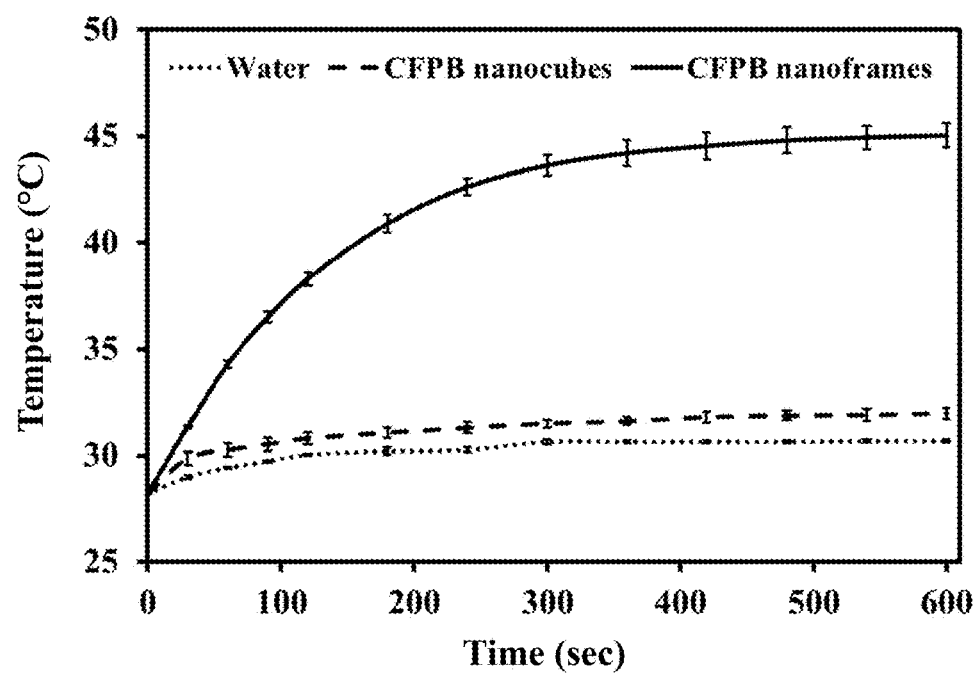
Figure 1I:
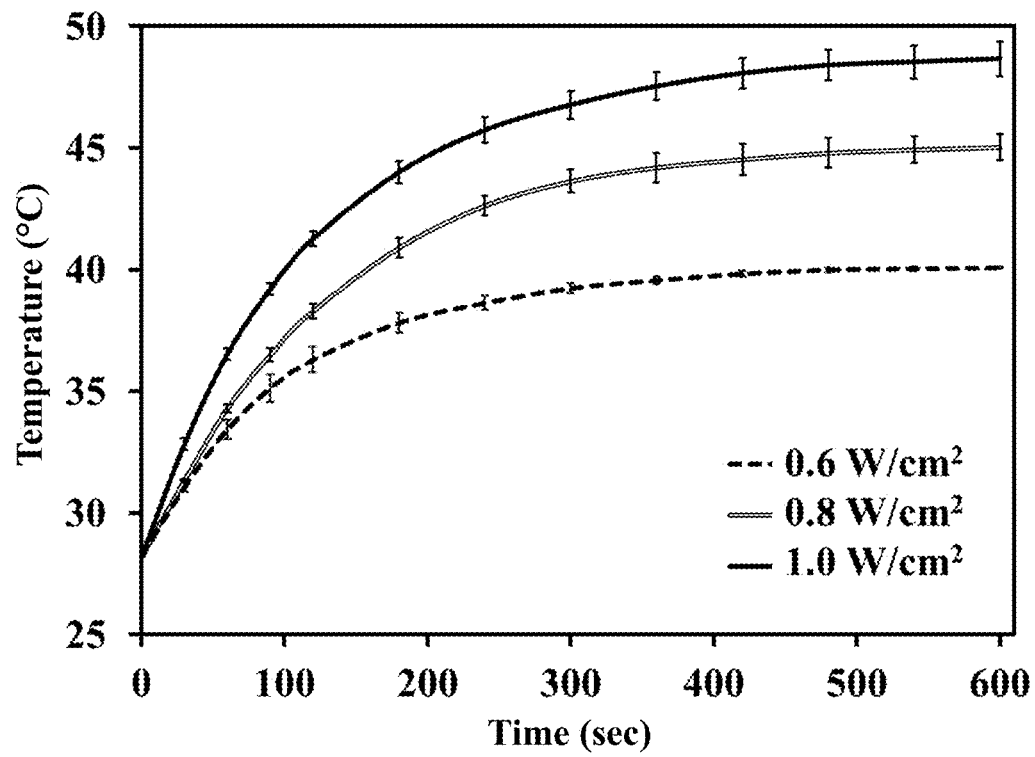
Figure 1J:
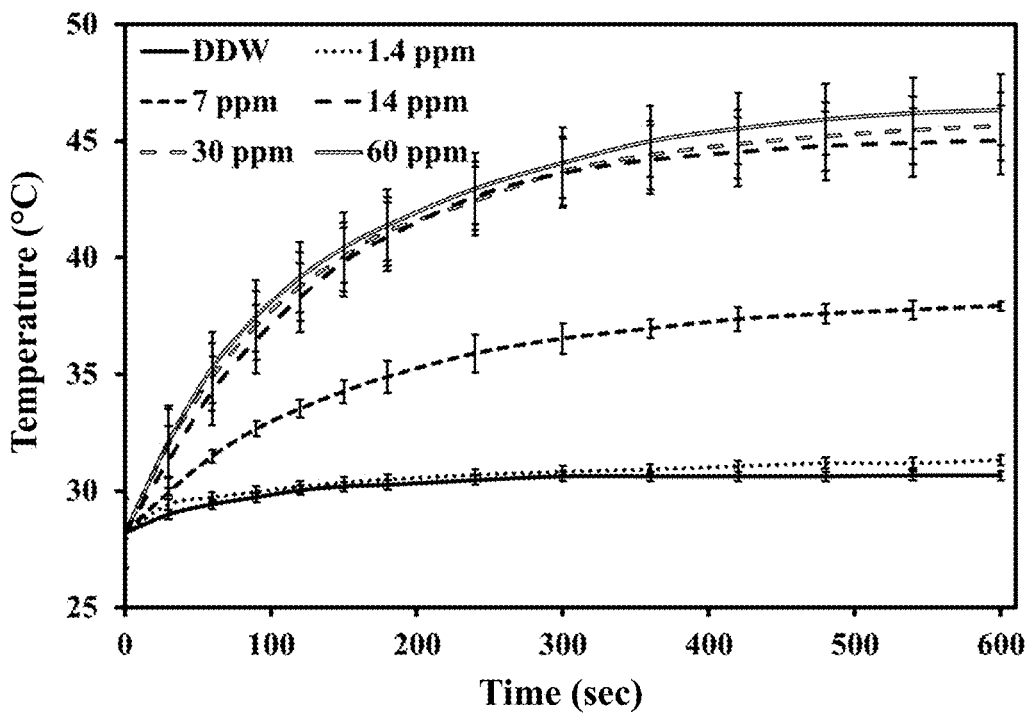

It is also noted that the absorbance in the near infrared reflectance (NIR) spectrum from 600 to 900 nm significantly increased over time during the formation of all the nanoframes (FIGS. 1E-1G). The color of the colloidal solutions changed gradually from brown to blue, suggesting production of the composition $Fe^{3+}$—N≡C—$Fe^{2+}$ during acid etching; typically, the blue color of PB originates from the charge transfer of $Fe^{2+}$ to $Fe^{3+}$. The above optical feature may thence serve as another indicator for the structural change from nanocube to nanoframe. As the CFPB nanoframe exhibited the property of NIR absorption, its photothermal effect was further studied hereinafter. As anticipated, the nanoframe exhibited a rapid temperature increase to 42° C. within a 5-minute exposure, as compared with that of the CFPB nanocube, which showcased no apparent heating behavior (FIGS. 1H-1J), suggesting the nanoframe has excellent photothermal effect, which may help kill cancer cells within a short time when a photothermal therapy is concurrently administered. The photothermal conversion efficiency η of CFPB nanoframes under irradiation (808 nm) is 13.6% (data not shown). The photothermal effect may serve as another indicator for the presence of the nanoframe in this regard.

From the results provided above, presumably a proton-induced metal replacement reaction occurred in the acid-etching process, which endows all the PBA nanocubes (i.e. the CFPB, the MFPB, and the NFPB nanocubes) the ability of NIR absorption ex nihilo. The corrosion of the nanocube was associated with two reactions: acid etching and metal ion replacement. During the acid-etching process of the CFPB nanocube, the composition of the $Co^{2+}$—N≡C—$Fe^{3+}$, the $Co^{2+}$—N≡C—$Fe^{2+}$, and the $Co^{3+}$—N≡C—$Fe^{2+}$ were decomposed to yield the fragments as follows: $Co^{2+}$, $Co^{3+}$, $[Fe(CN)_6]^{3-}$, and $[Fe(CN)_6]^{4-}$, in which $[Fe(CN)_6]^{3-}$ and $[Fe(CN)_6]^{4-}$ reacted with protons to produce $Fe^{2+}$, $Fe^{3+}$, and HCN. The $Fe^{2+}$ ions were further oxidized to $Fe^{3+}$ in an oxygen-containing environment, and the resulting $Fe^{3+}$ in turn substituted the cobalt ions in the un-etched composition of the $Co^{3+}$—N≡C—$Fe^{2+}$ and the $Co^{2+}$—N≡C—$Fe^{2+}$ to form the $Fe^{3+}$—N≡C—$Fe^{2+}$, thereby increasing NIR absorption in the nanoframe structure.

Example 2 the Chemodynamics of the CFPB Nanocube and Nanoframe

Figure 2A:
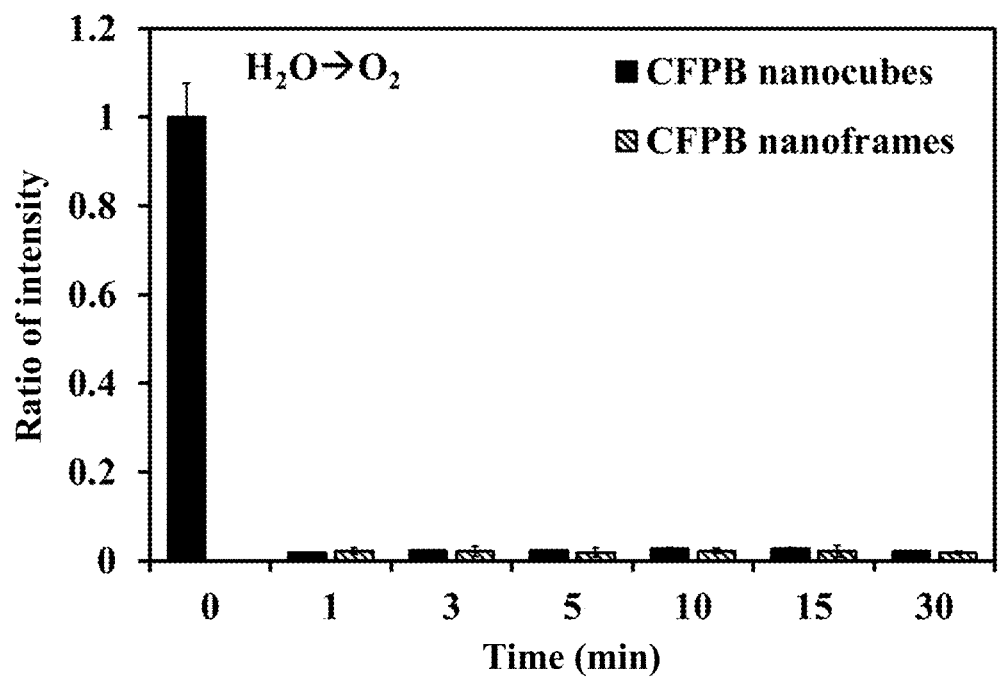
FIGS. 2A-2H depict the self-supply generation of $O_2$, $H_2O_2$, and ·OH from $H_2O$ by the CFPB nanocube and nanoframe.
Figure 2B:
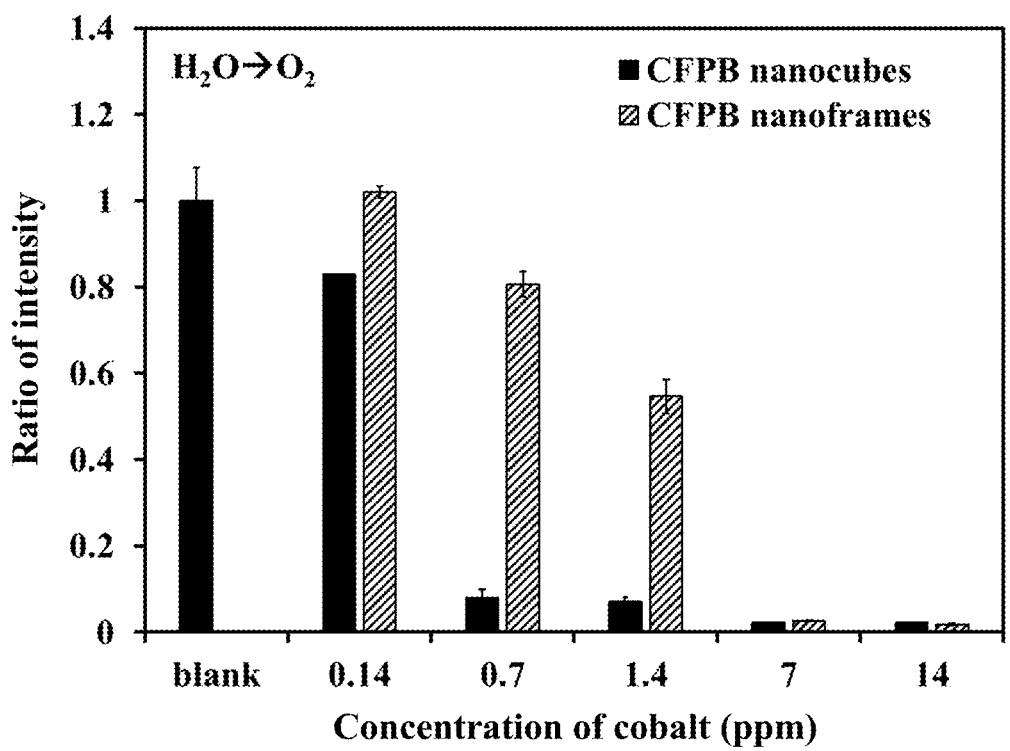

The chemodynamics of the nanocubes and nanoframes of Example 1 were investigated in the present example. First, in the water-splitting reaction that generated $O_2$ (i.e., $2H_2O \rightarrow 2H_2+O_2$), the presence of $O_2$ may be detected by the fluorescence emitted from $[Ru(dpp)_3]Cl_2$, in which the decline of fluorescence intensity indicates the presence of $O_2$. As shown in FIG. 2A, rapid oxygen generation by both of the CFPB nanocobe and nanoframe was observed within 1 minute at a fixed cobalt concentration of 14 ppm; and in the experiment of the concentration dependence, the fluorescence dramatically dropped at 0.7 ppm for the CFPB nanocube and at 7 ppm for the CFPB nanoframe, suggesting $O_2$ was generated, both of which roughly appeared in a dose-dependent manner (FIG. 2B). These results demonstrated that the present CFPB nanocube and nanoframe may spontaneously trigger water splitting to generate $O_2$ without any additional energy supplied from outside, contrary to a general knowledge that CFPB can be triggered for electro- or photocatalysis by an additional energy to perform a water-splitting reaction to produce oxygen.

Figure 2C:
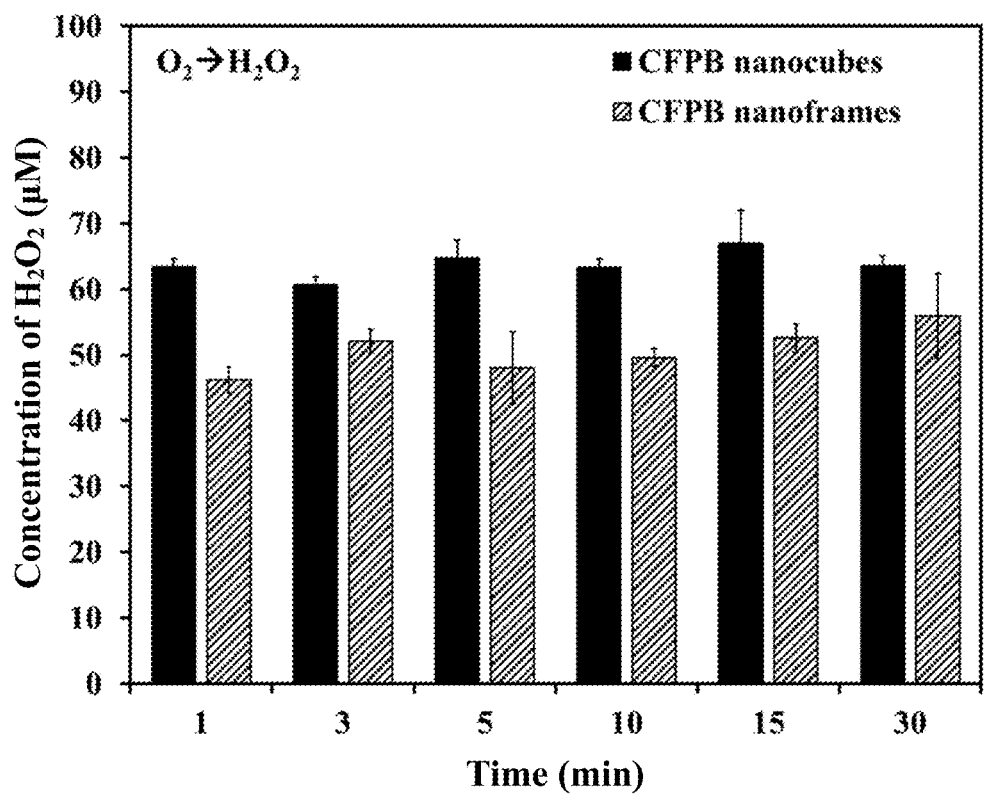
Figure 2D:
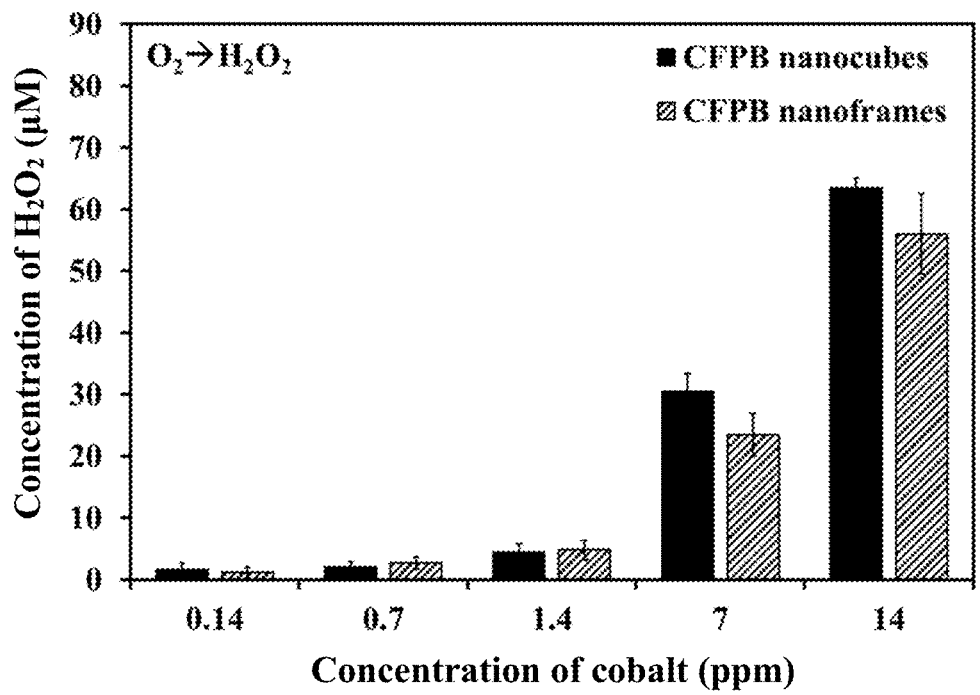
Figure 2E:
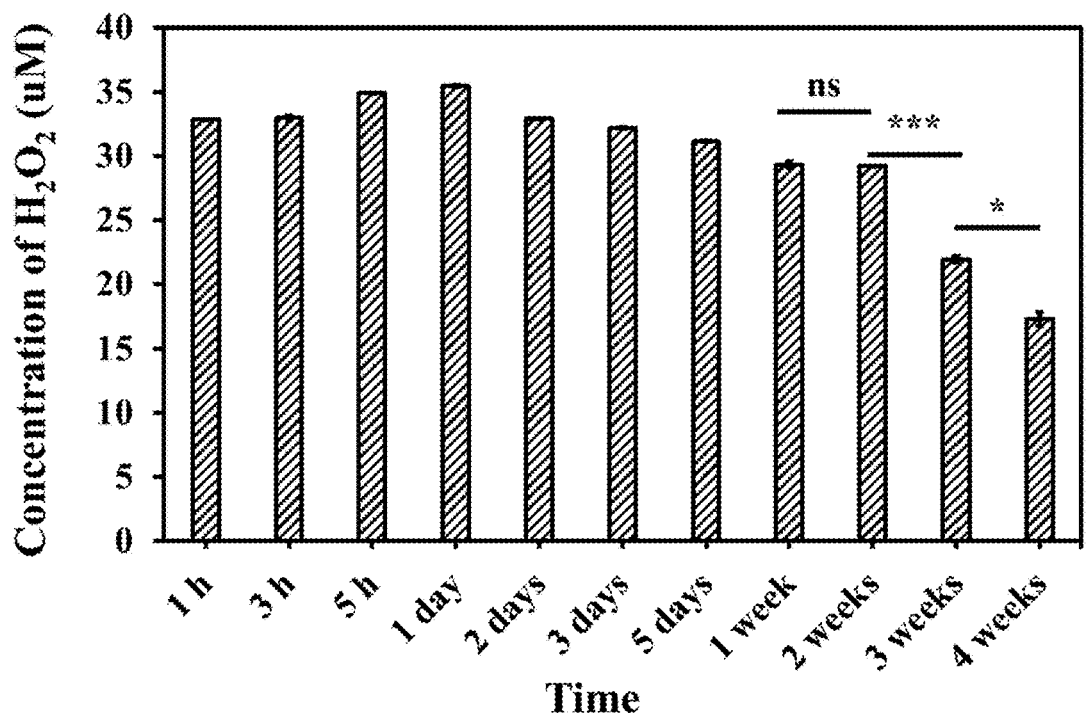

The ability of the present CFPB nanocube and nanoframe to undertake an oxygen reduction reaction (ORR) (i.e., $O_2+2e^-+2H^+\rightarrow H_2O_2$) was investigated herein. A colorimetric method employing the chemical reaction of KI and $H_2O_2$ to yield yellowish $I_3^-$ followed by UV-Vis quantitation was used to detect the generation of $H_2O_2$. It was found that $H_2O_2$ production occurred rapidly within 1 minute before reaching a plateau at a fixed cobalt concentration of 14 ppm (FIG. 2C); and in the experiment of the concentration dependence, $H_2O_2$ was produced by the CFPB nanocube and the CFPB nanoframe, both of which exhibited concentration dependence (FIG. 2D). It was also found that the CFPB nanoframe continued to produce $H_2O_2$ for a month (FIG. 2E). Taken together, these data elucidated that both the CFPB nanocube and the CFPB nanoframe can undertake the ORR reaction automatically to generate abundant $H_2O_2$ without external triggers, as opposed to previous publications that a metal can carry out the ORR under an external energy supply.

Figure 2F:
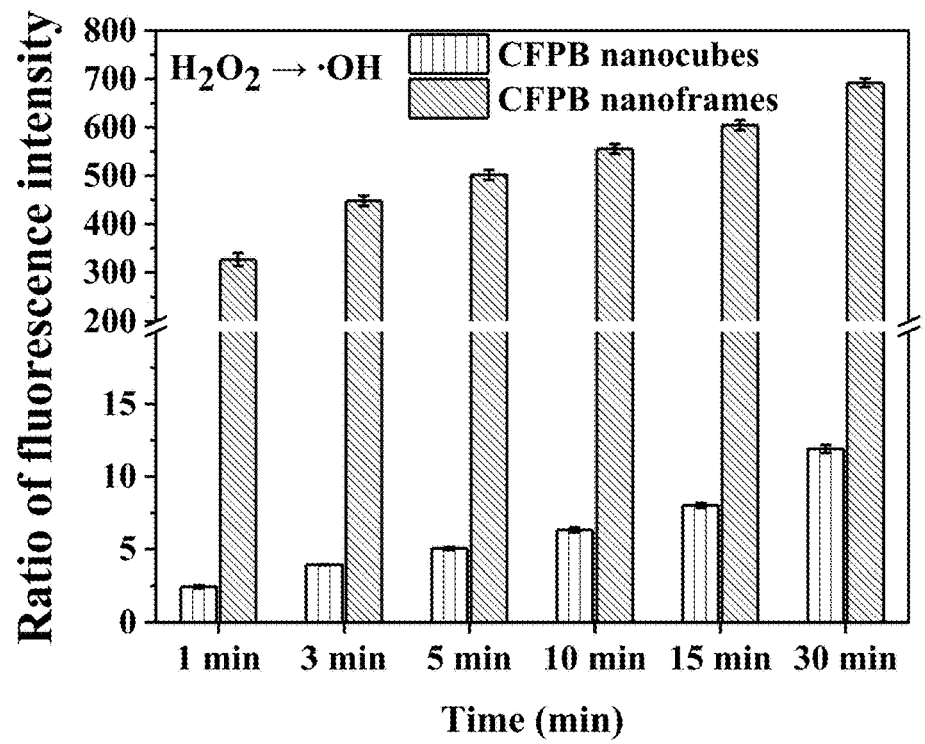
Figure 2G:
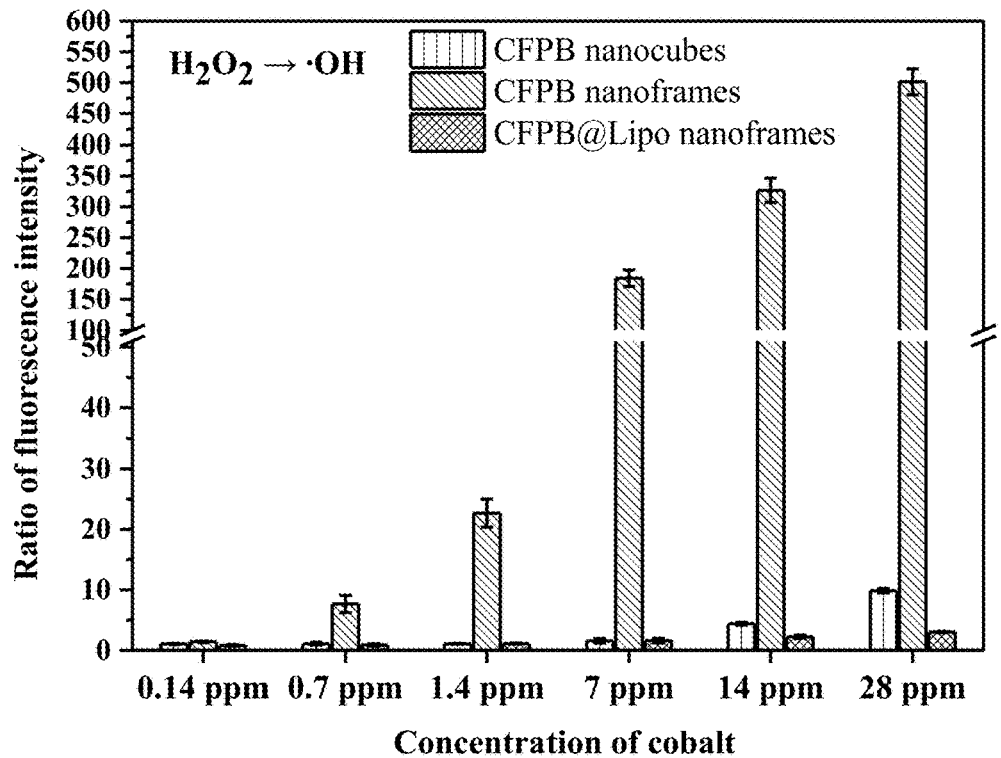
Figure 2H:
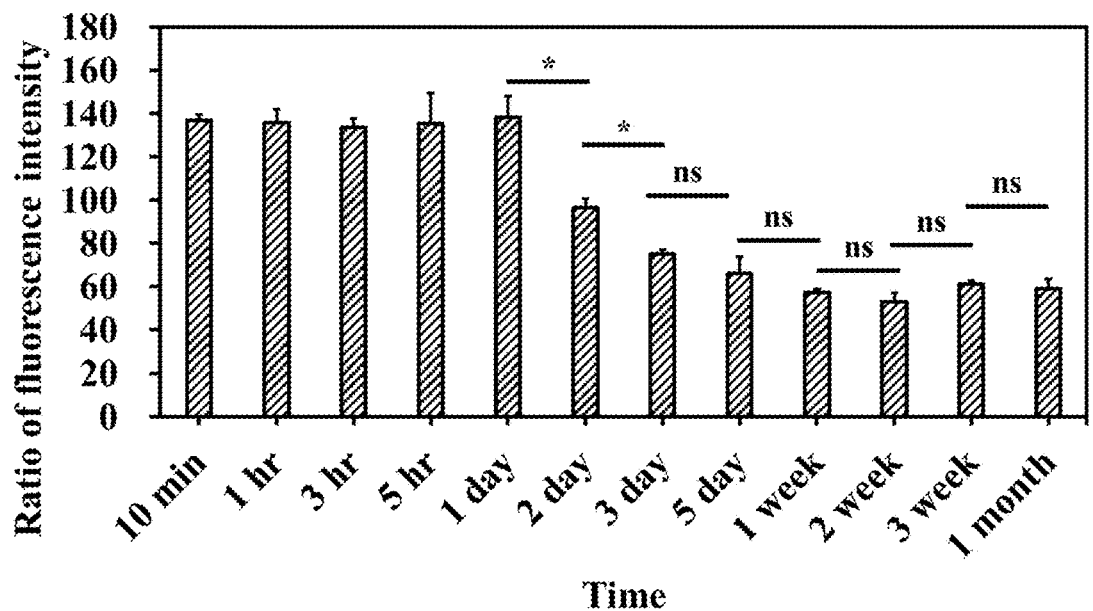

Further, the ability of the present CFPB nanocube and nanoframe to commit a Fenton-like reaction (i.e., $H_2O_2+Fe^{2+}\rightarrow \cdot OH+Fe^{3+}$) was examined below. An APF dye, a ·OH indicator, was used to monitor the production of ·OH by the CFPB nanocube and the CFPB nanoframe, in which the increase of the fluorescence intensity indicates the presence of ·OH. Notably, the CFPB nanoframe significantly outperformed the CFPB nanocube in ·OH production at a fixed cobalt concentration of 14 ppm (FIG. 2F), and in the concentration-dependent profile (FIG. 2G), which was obtained after 1 min of reaction for the generation of ·OH. Long-term (1 month) generation of ·OH from the CFPB nanoframe was noticed, suggesting a sustainable chemodynamic reaction continued (FIG. 2H). In fact, the CFPB nanoframe was found to retain its structure after 8 months of storage (data not shown). These data confirmed that the present CFPB nanocube and nanoframe can conduct the Fenton-like reaction to give ·OH, albeit to different levels; these characteristics are of great use in treating cancer.

Considering increased oxidative stress in blood circulation may compromise a sustained chemodynamic reaction by the CFPB nanoframe, a liposome was introduced to encapsulate the CFPB nanoframe, CFPB@liposome (CFPB@Lipo), in which the lipid membrane of the liposome facilitates the CFPB nanoframe diffusing into cells. The production of ·OH was significantly suppressed, suggesting that the liposome could effectively prevent the continuous chemodynamic reaction during blood circulation before entering cancer cells (FIG. 2G). The CFPB@Lipo nanoframe was extremely stable, retaining their structure intact after 7 days of incubation in various media, including $H_2O$, PBS (pH5 or pH7), and 10% serum (data not shown).

Example 3 The In Vitro Therapeutic Effects of the CFPB Nanoframe

Figure 3A:
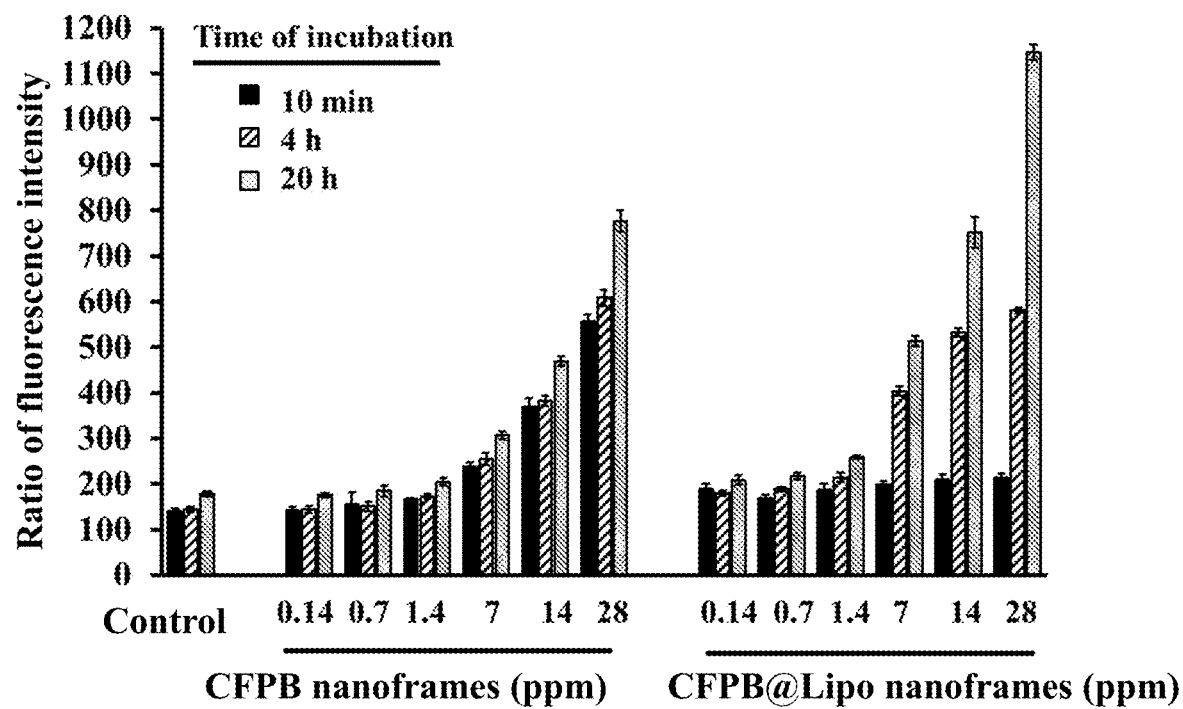
FIGS. 3A-3F depict the cytotoxic effects of the CFPB nanoframe (with or without encapsulated in the liposome) on the cells.
Figure 3B:
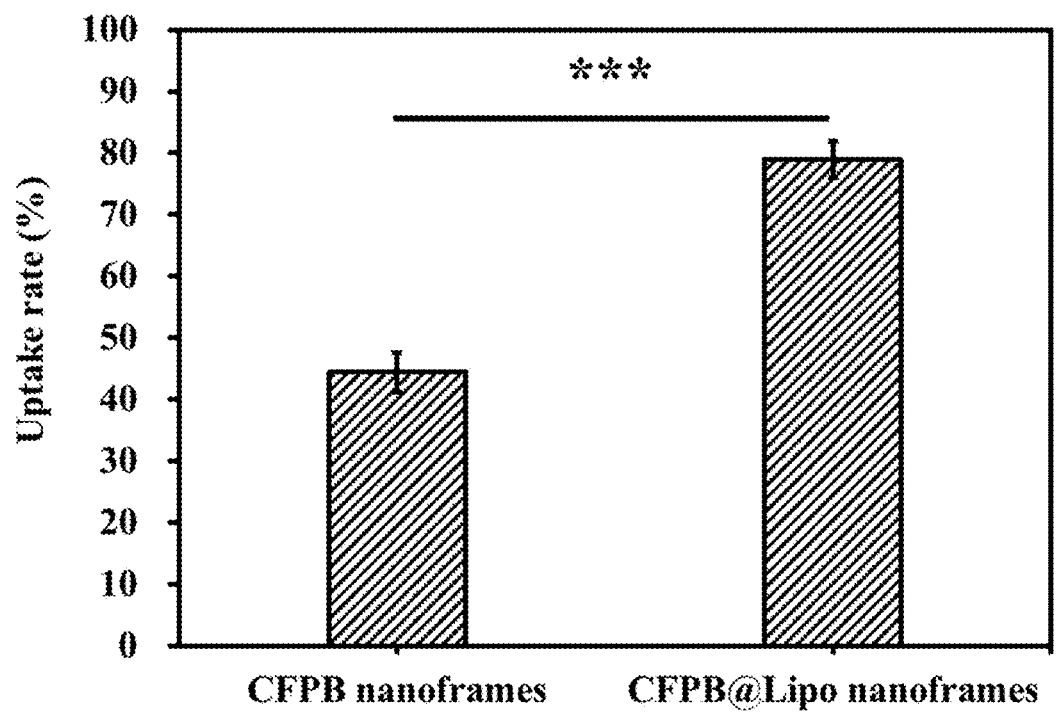

The therapeutic effects (via CDT and/or PTT) of the CFPB and the CFPB@Lipo nanoframes of Example 1 on treating cancer cells were studied in the present example. A lung carcinoma cells, A549 cells, were used as an example to prove the above concept. First of all, the ·OH level generated in the A549 cells by the CFPB and the CFPB@Lipo nanoframes was evaluated by use of the APF dye. According to FIG. 3A, the generation of ·OH by the CFPB and the CFPB@Lipo nanoframes exhibited both time- and dose-dependency. It is noted that no immediate production of ·OH by the CFPB@Lipo nanoframe was observed within 10 minutes of incubation, indicating a delayed onset of the water-driven chemodynamic reaction. As compared with the CFPB nanoframe, significant production of ·OH by the CFPB@Lipo nanoframe was found at the times of 4 or 20 hours, suggesting that the liposome assists the entry of the encapsulated CFPB nanoframe into the cells, thereby facilitating generation of ·OH within the cells. In addition, higher intracellular $H_2O_2$ was detected in the CFPB@Lipo nanoframe treatment group than in the CFPB nanoframe treatment group (data not shown), consistent with the observation found in FIG. 3A, which may partially attribute to higher cellular uptake of the CFPB@Lipo nanoframe than the CFPB nanoframe (FIG. 3B). A significant increase of early- and late-apoptotic cells after 24 hour incubation with the CFPB@Lipo nanoframe was seen via flow cytometry analysis (data not shown).

Figure 3C:
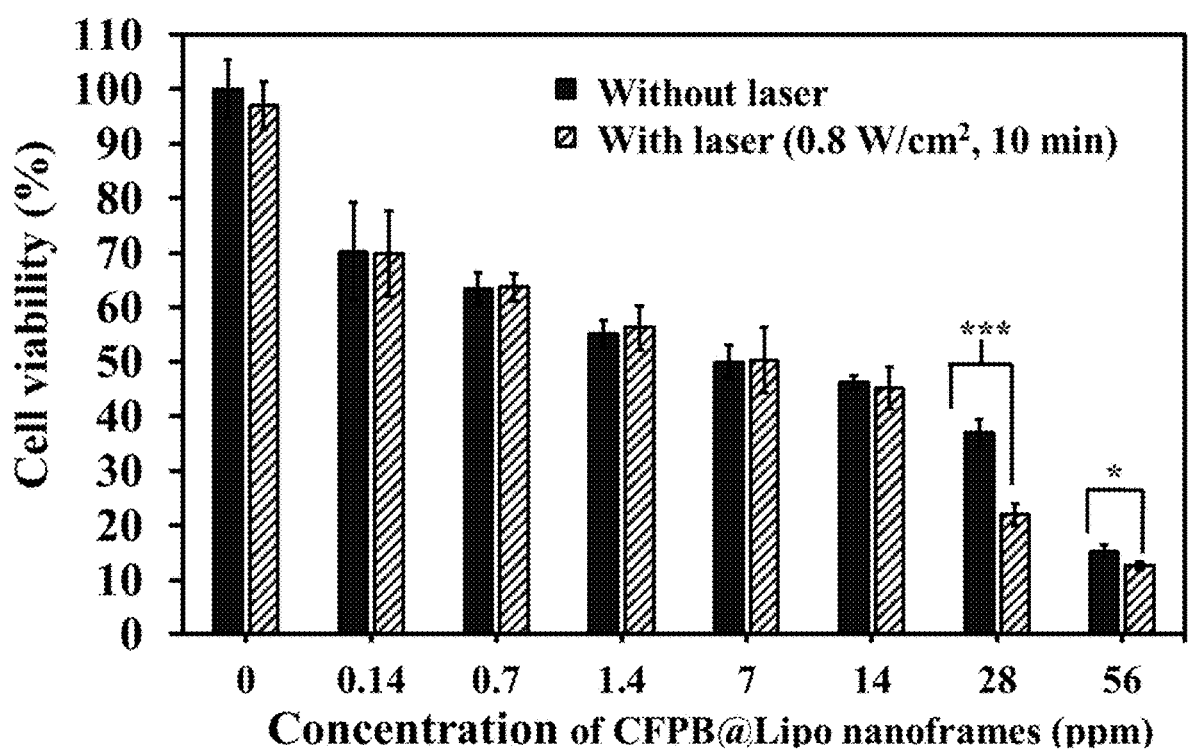
Figure 3D:
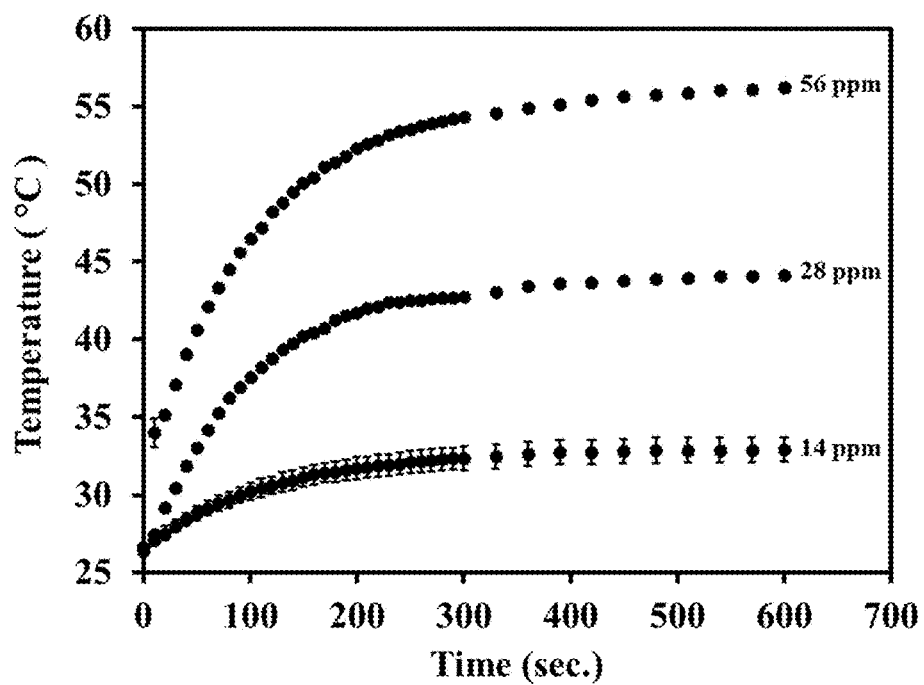
Figure 3E:
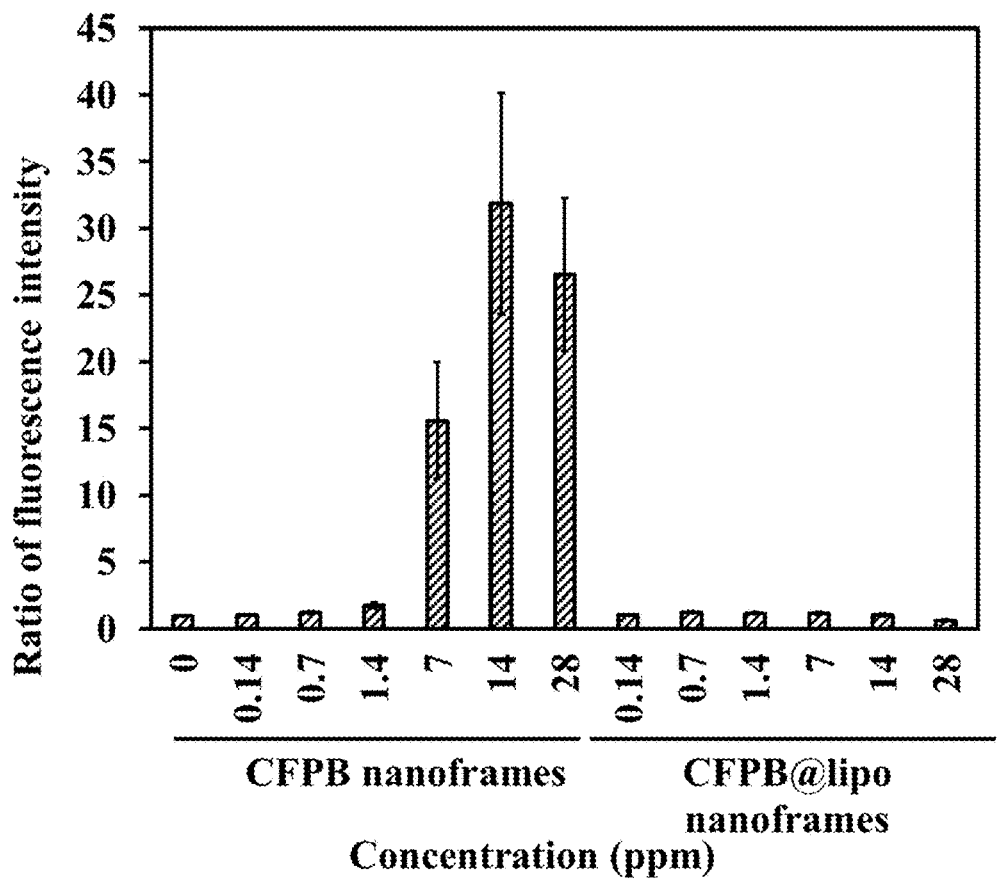
Figure 3F:
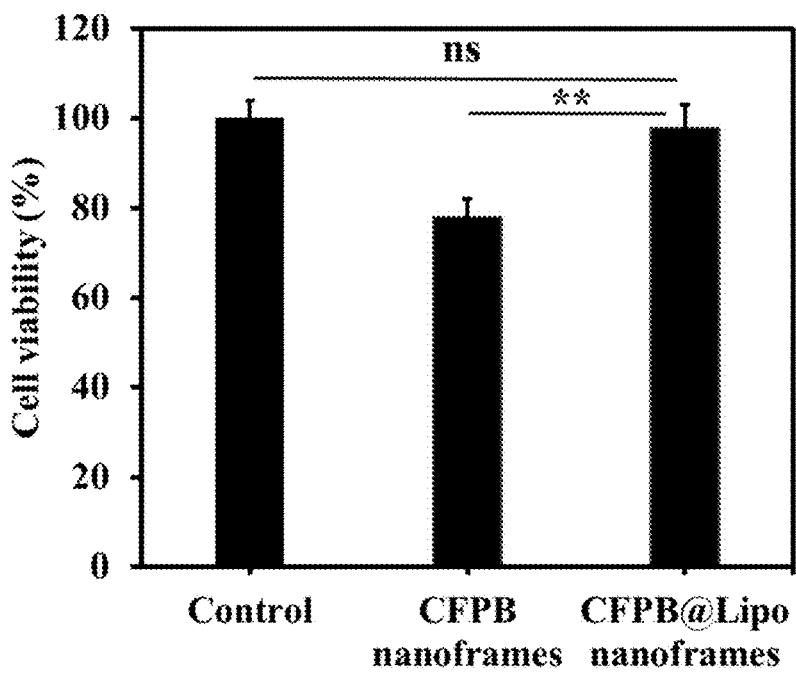

Next, the cytotoxic effect of the CFPB@Lipo nanoframe on the A549 cells was examined with or without an additional laser exposure (0.8 W/cm$^2$, 10 minutes), and dosage-dependent profiles were observed in both the treatment groups (FIG. 3C). Notably, when the concentration of the CFPB@Lipo nanoframe reached 28 ppm, the synergistic effect of the CDT and the PTT was observed, leading to great suppression of the cell viability at this point (FIG. 3C), in which the heating temperature reached 42° C. in the cell cultures (FIG. 3D). Before conducting in vivo animal studies, the generation of the additional ·OH in blood circulation should be avoided. To this end, the CFPB and the CFPB@Lipo nanoframes were individually incubated with blood, which contained 2% red blood cells, to evaluate the ·OH production. No appreciable signal of ·OH was detected from the CFPB@Lipo nanoframe treatment group across the indicated dosages, whereas an enhanced signal was detected at higher dosages from the CFPB nanoframe treatment group (FIG. 3E). Neither hemolytic phenomenon (data not shown) nor vascular endothelial cell damage (FIG. 3F) from the CFPB@Lipo nanoframe treatment group was seen, as compared with that from the CFPB nanoframe treatment group.

Example 4 The In Vivo Therapeutic Effects of the CFPB Nanocube or Nanoframe

As both of the CFPB nanocube and the CFPB nanoframe were capable of producing ·OH (FIGS. 2F-2G), the therapeutic effects of the CFPB nanocube (encapsulated in a liposome, the CFPB@Lipo nanocube) and the CFPB@Lipo nanoframe of Example 1 in vivo were explored in the present example.

An animal model with orthotopic tumors using Hep G2-Red-FLuc cells (a human hepatocellular carcinoma cell line with expression of luciferase) was established for better monitoring tumor growth via emitted bioluminescence. These mice were arbitrarily divided into three treatment groups: the PBS, the CFPB@Lipo nanocube, and the CFPB@Lipo nanoframe treatment groups. For a first batch of experiments, a single dose (100 ppm/mouse) was intravenously injected into the mice and their tumor size were monitored under a live imaging IVIS image system (data not shown), in which the tumors in both the CFPB@Lipo nanocube and the CFPB@Lipo nanoframe treatment groups were of reduced tumor growth rates, in contrast to that in the PBS treatment (data not shown). Also, in this experiment, tumor growth inhibition was more prominent in the CFPB@Lipo nanoframe treatment group than in the CFPB@Lipo nanocube treatment group (data not shown). However, as the tumor growth could not be efficiently suppressed in both the CFPB@Lipo nanocube and the CFPB@Lipo nanoframe treatment groups following a single dose administration (data not shown), a second batch of experiments, a treatment schedule with two dose administration, was then arranged (with the 2nd dose administered on the post-7th day).

Figure 4A:
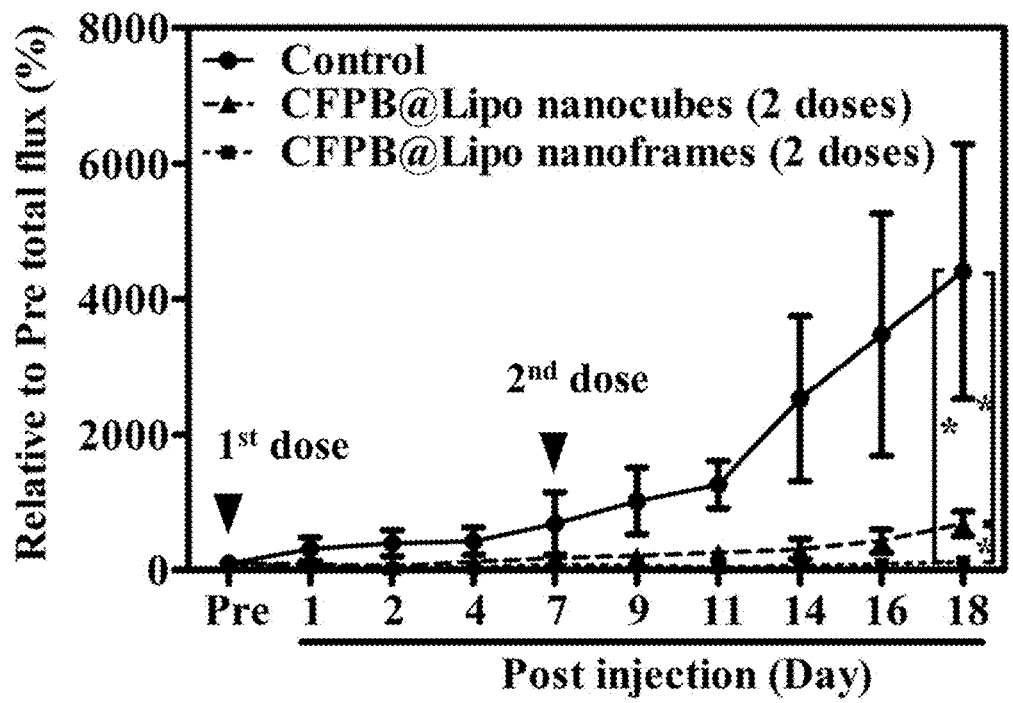
FIGS. 4A-4G depict the anti-tumor activity of the CFPB nanocube or nanoframe encapsulated in the liposome (designated as the CFPB@Lipo nanocube and the CFPB@Lipo nanoframe, respectively) on the tumor-bearing mice.
Figure 4B:
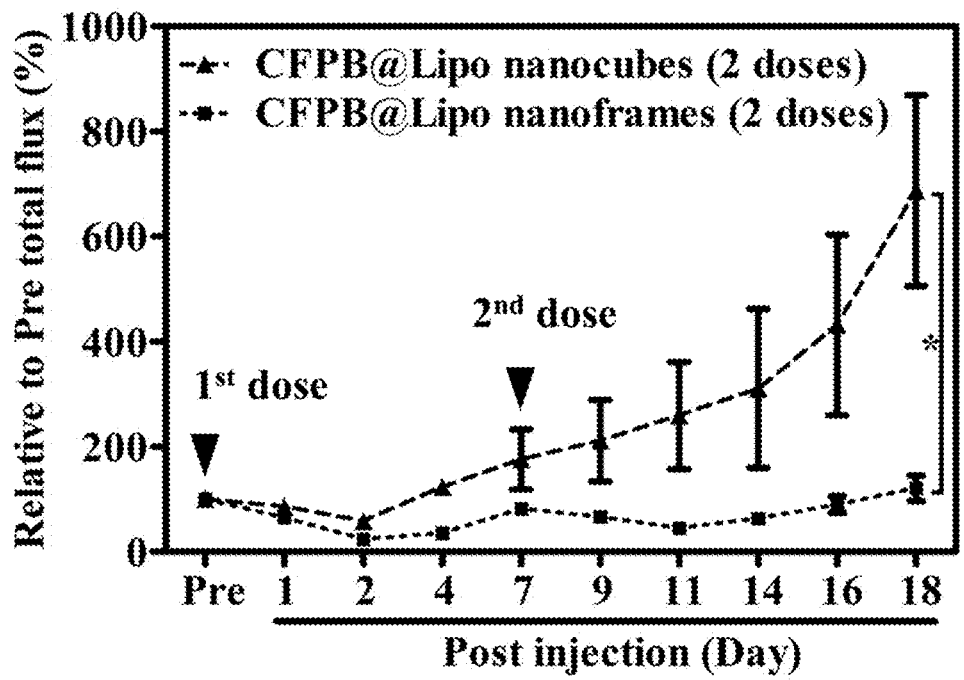
Figure 4C:
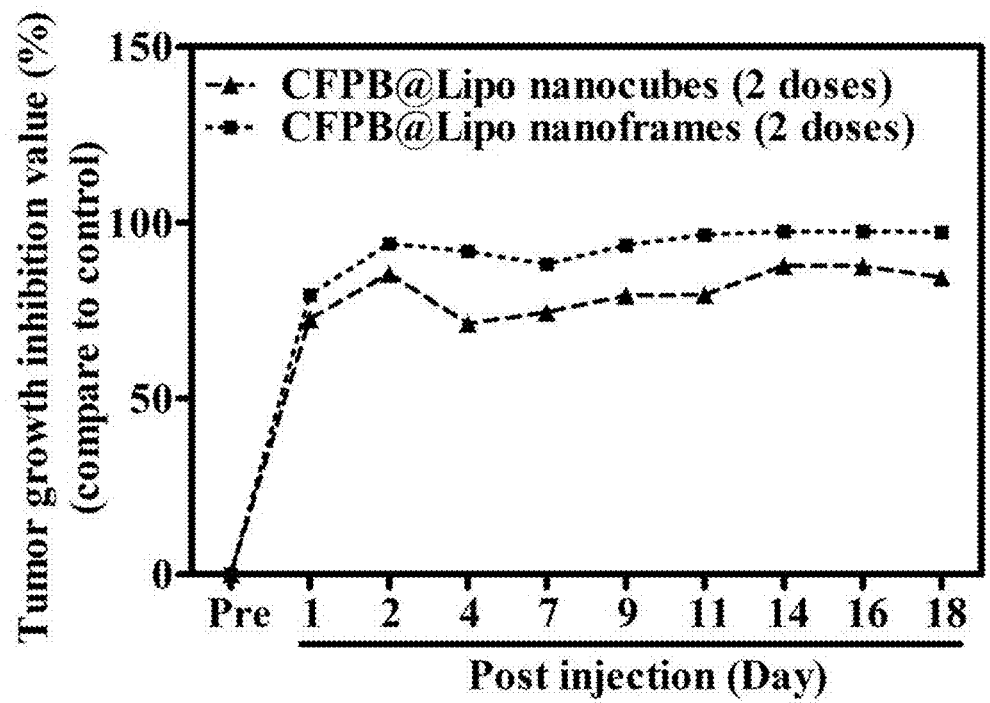
Figure 4D:
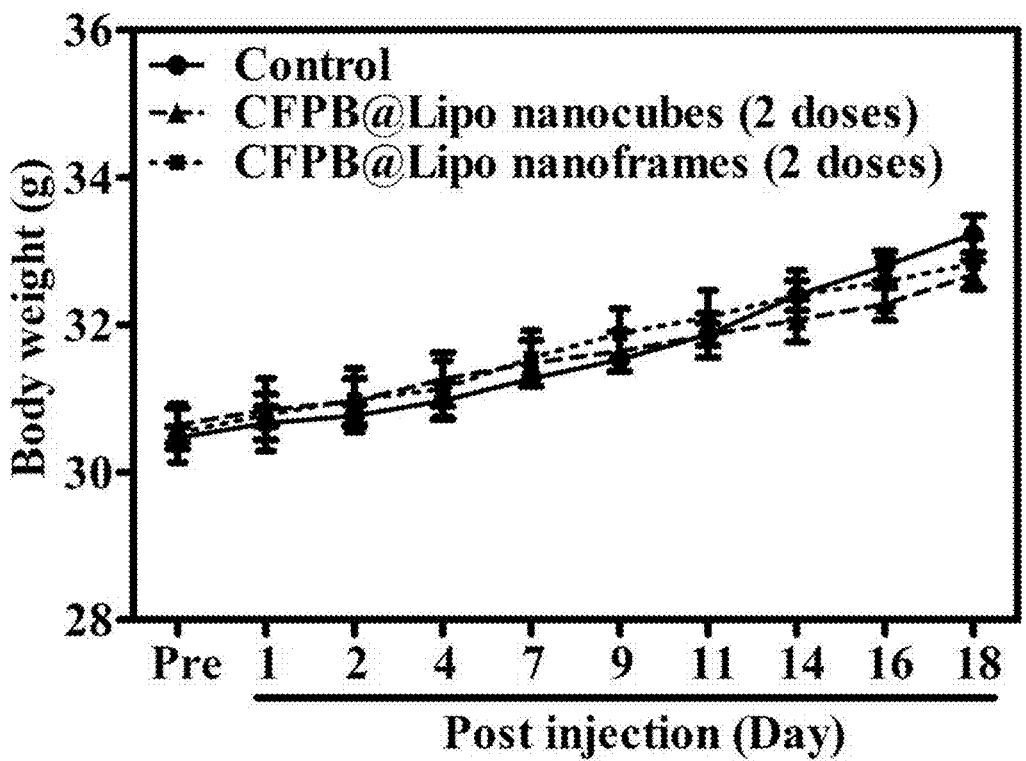
Figure 4E:
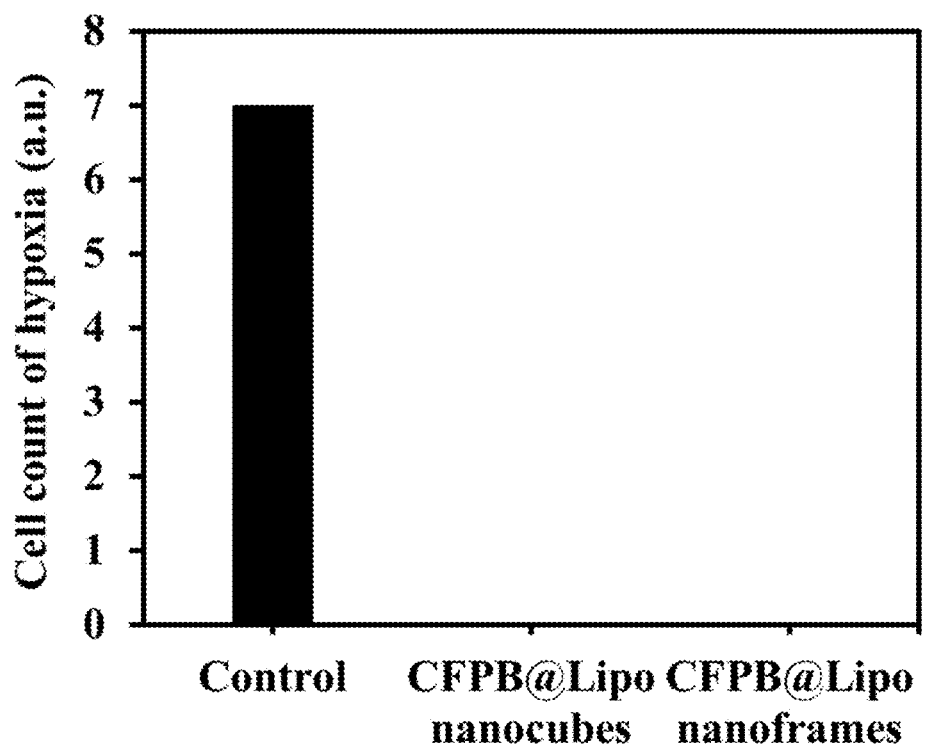
Figure 4F:
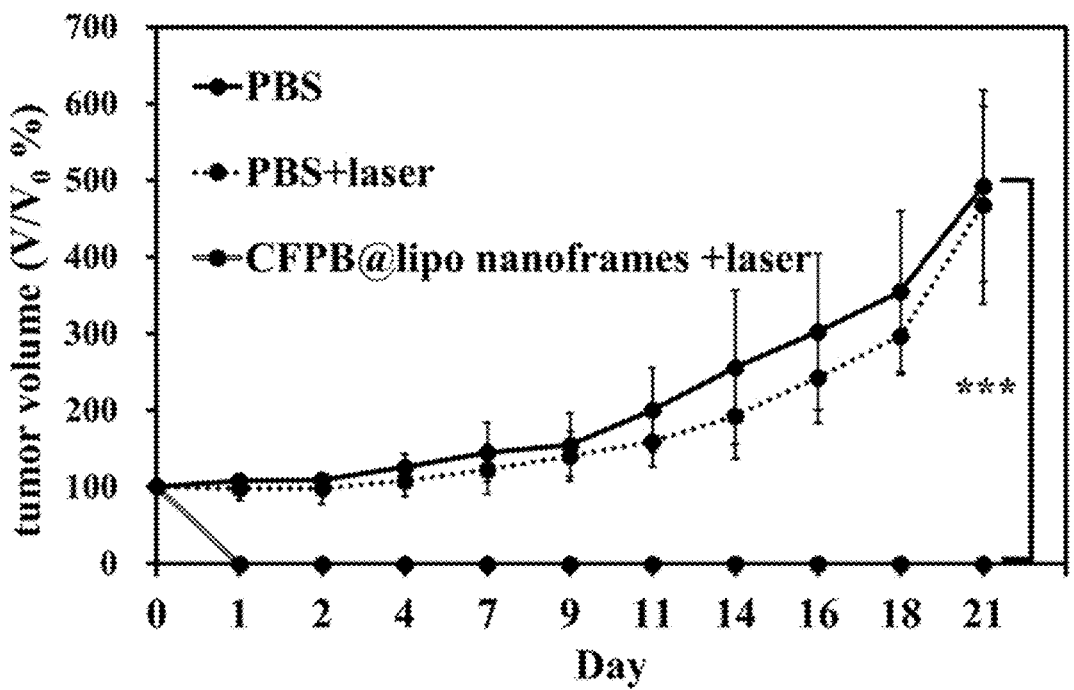
Figure 4G:
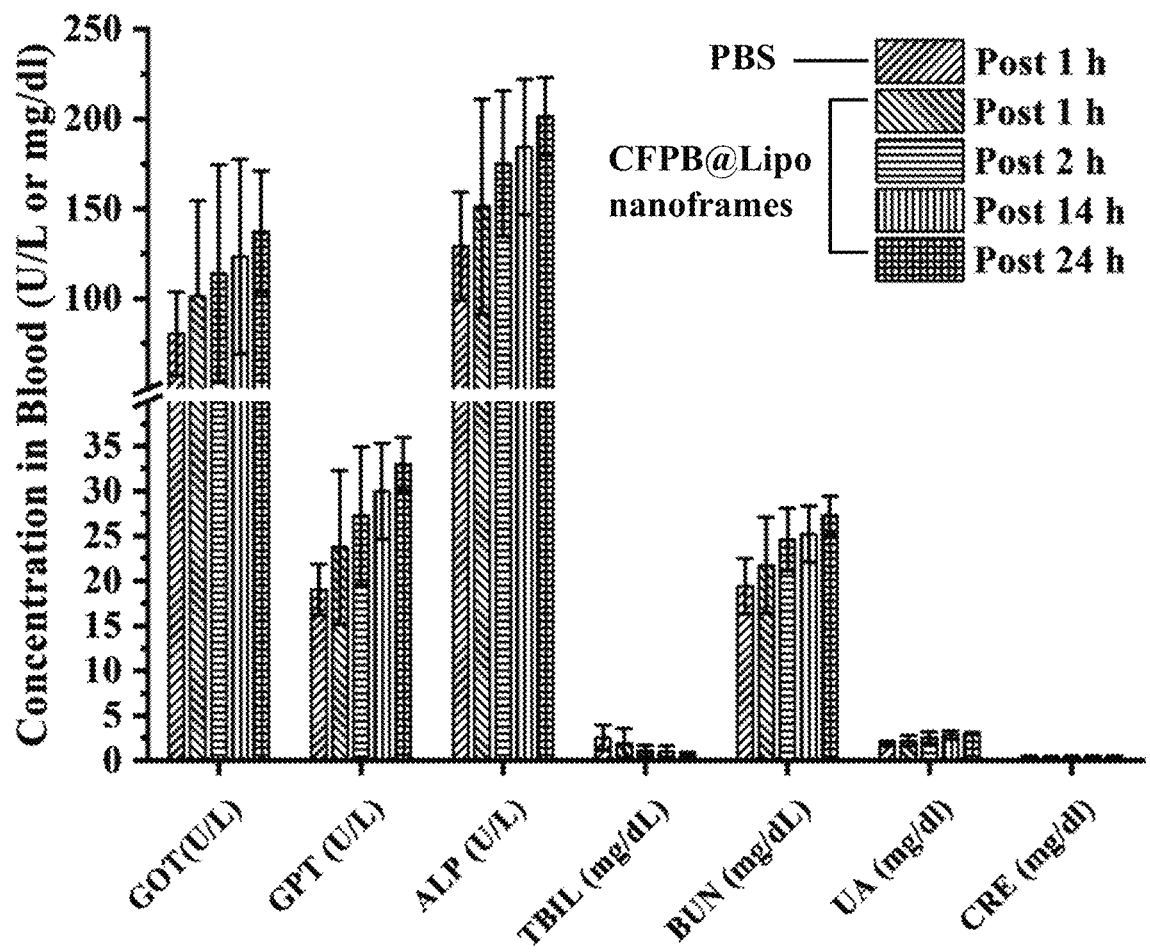

The results for the second batch of experiments (with two dose administration) were provided as follows. The tumor growth in the groups treated with the CFPB@Lipo nanocube and the CFPB@Lipo nanoframe was significantly suppressed as compared with the group treated with PBS (FIG. 4A), while the tumor growth in the group treated with the CFPB@Lipo nanoframe was even more suppressed than that in the group treated with the CFPB@Lipo nanocube (FIG. 4B). The TGI profile of the CFPB@Lipo nanoframe treatment group showed steady tumor suppression to about 97% throughout the experiment (FIG. 4C), without noticeable change in body weight observed for either single or two dose treatments (FIG. 4D). The hypoxia in the tumor tissues of the groups treated with the CFPB@Lipo nanocube and the CFPB@Lipo nanoframe was ameliorated, owing to the $O_2$ generated from water oxidation (FIG. 4E). To understand the therapeutic efficacy of a combined therapy (i.e., the CFPB@Lipo nanoframe in combination with the PTT by an 808 nm laser), thus to evaluate the photothermal capability of the CFPB nanoframe, an animal model with subcutaneous tumors was first established for this purpose, to expedite the provision of an 808 nm laser. And the results for the combined therapy revealed that the combined therapy (the CFPB@Lipo nanoframe in combination with an 808 nm laser) completely suppressed the tumor growth within one day after the combined therapy was given, and there was no tumor relapsed throughout the experiment (FIG. 4F), indicating that the combination therapy is an effective strategy for treating cancer, in which the CFPB@Lipo nanoframe may serve as a photothermal agent, and a synergistic effect is seen when the CFPB@Lipo nanoframe is used in combination with the PTT (i.e., a laser exposure). As a supplement, the results of the biochemical blood tests submitted that no significant difference in liver and kidney function indexes was found for the CFPB@Lipo nanoframe-treated mice (FIG. 4G).

In sum, the present discloser provides a novel, easy way to prepare the nanoframes as described herein, and provides a promising strategy for treating cancer with the aid of the present nanocube and nanoframe, which achieves sustainable self-supply of $H_2O_2$ in tumors, thereby promoting the therapeutic effect of CDT in treating cancer.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method for treating a cancer in a subject in need thereof, comprising administering an effective amount of a liposome encapsulating therein a nanoframe of a Prussian blue analogue to the subject, wherein
   the nanoframe of the Prussian blue analogue is produced by:
   (a) mixing a nanocube of a Prussian blue analogue with a hydrochloride acid (HCl) solution to form a mixture; and
   (b) heating the mixture of the step (a) in an oil bath at 80-100° C. for 0.5 hours-1 month to produce the nanoframe of the Prussian blue analogue.

2. The method of claim 1, wherein the cancer is selected from the group consisting of a bladder cancer, a bone cancer, a bone marrow cancer, a brain cancer, a breast cancer, a cholangiocarcinoma, a colon cancer, an esophagus cancer, a gastrointestinal cancer, a gum cancer, a head and neck cancer, a kidney cancer, a liver cancer, a lung cancer, a nasopharyngeal carcinoma, a leukemia, a lymphoma, an ovary cancer, a prostate cancer, a skin cancer, a stomach cancer, a testis cancer, a tongue cancer, and a uterus cancer.

3. The method of claim 2, wherein the cancer is a liver cancer or a lung cancer.

4. The method of claim 1, further comprising administering an additional anti-cancer treatment to the subject, wherein the additional anti-cancer treatment is at least one of a photothermal therapy (PTT), a surgery, a chemotherapy, a radiotherapy, an immunotherapy, or a targeted therapy.

5. The method of claim 4, wherein the additional anti-cancer treatment is the photothermal therapy.

6. The method of claim 1, wherein the liposome is administered to the subject in the amount of 10 μg/kg-1 mg/kg.

7. The method of claim 1, wherein the subject is a human.

8. The method of claim 1, further comprising:
   (c) centrifuging the nanoframe of the Prussian blue analogue at 9,000 rpm for 5 minutes;
   (d) washing the precipitate of step (c) with 50-90% ethanol; and
   (e) repeating the steps of (c) to (d) for 2-4 times.

9. The method of claim 1, wherein in step (a), the Prussian blue analogue is cobalt-iron Prussian blue (CFPB), manganese-iron Prussian blue (MFPB), or nickel-iron Prussian blue (NFPB).

* * * * *